United States Patent
Shin et al.

(10) Patent No.: US 12,460,037 B2
(45) Date of Patent: Nov. 4, 2025

(54) PREPARING METHOD OF SUPERELASTOMER, SUPERELASTOMER PREPARED USING THE SAME, AND MOLDED ARTICLE CONTAINING SUPERELASTOMER

(71) Applicant: KOREA RESEARCH INSTITUTE OF CHEMICAL TECHNOLOGY, Daejeon (KR)

(72) Inventors: Jihoon Shin, Daejeon (KR); Sae Hume Park, Daejeon (KR); Jeong Suk Yuk, Daejeon (KR)

(73) Assignee: KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 659 days.

(21) Appl. No.: 17/665,137

(22) Filed: Feb. 4, 2022

(65) Prior Publication Data

US 2022/0259362 A1 Aug. 18, 2022

(30) Foreign Application Priority Data

Feb. 5, 2021 (KR) .................. 10-2021-0016621

(51) Int. Cl.
| | |
|---|---|
| *C08G 63/08* | (2006.01) |
| *C08F 290/14* | (2006.01) |
| *C08G 63/85* | (2006.01) |
| *C08G 63/91* | (2006.01) |

(52) U.S. Cl.
CPC .......... *C08F 290/141* (2013.01); *C08G 63/08* (2013.01); *C08G 63/85* (2013.01); *C08G 63/912* (2013.01)

(58) Field of Classification Search
CPC ..... C08F 290/141; C08G 63/08; C08G 63/85; C08G 63/912
See application file for complete search history.

(56) References Cited

U.S. PATENT DOCUMENTS 10,533,075 B2 * 1/2020 Jasinska-Walc .......... C08F 8/06

FOREIGN PATENT DOCUMENTS

| KR | 101816283 | 1/2018 |
|---|---|---|
| KR | 20200127772 A * | 11/2020 |

OTHER PUBLICATIONS

Intellectual Property Office Request for the Submission of an Opinion; KR 10-2021-0016621; mailing date Nov. 16, 2022; 11 pages. (submitted with original document and full text English translation).
Shin, J.; Poly(isobutylene)-graft-Poly (ε-decalactone) Based Super-Resilient Elastomers; Chemical Engineering and Materials Research Information Center; Oct. 31, 2019; 1 page.
Intellectual Property Office Written Decision on Registration; KR 10-2021-0016621; mailing date May 25, 2023; 9 pages. (submitted with original document and full text English translation).
Castana, M., et al.; Synthesis of polyisobutylene-polycaprolactone block copolymers using enzyme catalysis; eXPRESS Polymer Letters; vol. 10 No. 8; Mar. 12, 2016; pp. 693-700.

* cited by examiner

*Primary Examiner* — Robert S Jones, Jr.
*Assistant Examiner* — Joshua Caleb Bledsoe
(74) *Attorney, Agent, or Firm* — HESLIN, ROTHENBERG, FARLEY & MESITI, P.C.; George S. Blasiak, Esq.

(57) ABSTRACT

Provided are a preparing method of a superelastomer, a superelastomer prepared using the same, and a molded article containing the superelastomer, and the superelastomer can be used as a biomaterial replacing soft tissues due to excellent strain at break and elastic recovery.

11 Claims, 15 Drawing Sheets

[FIG. 1A]
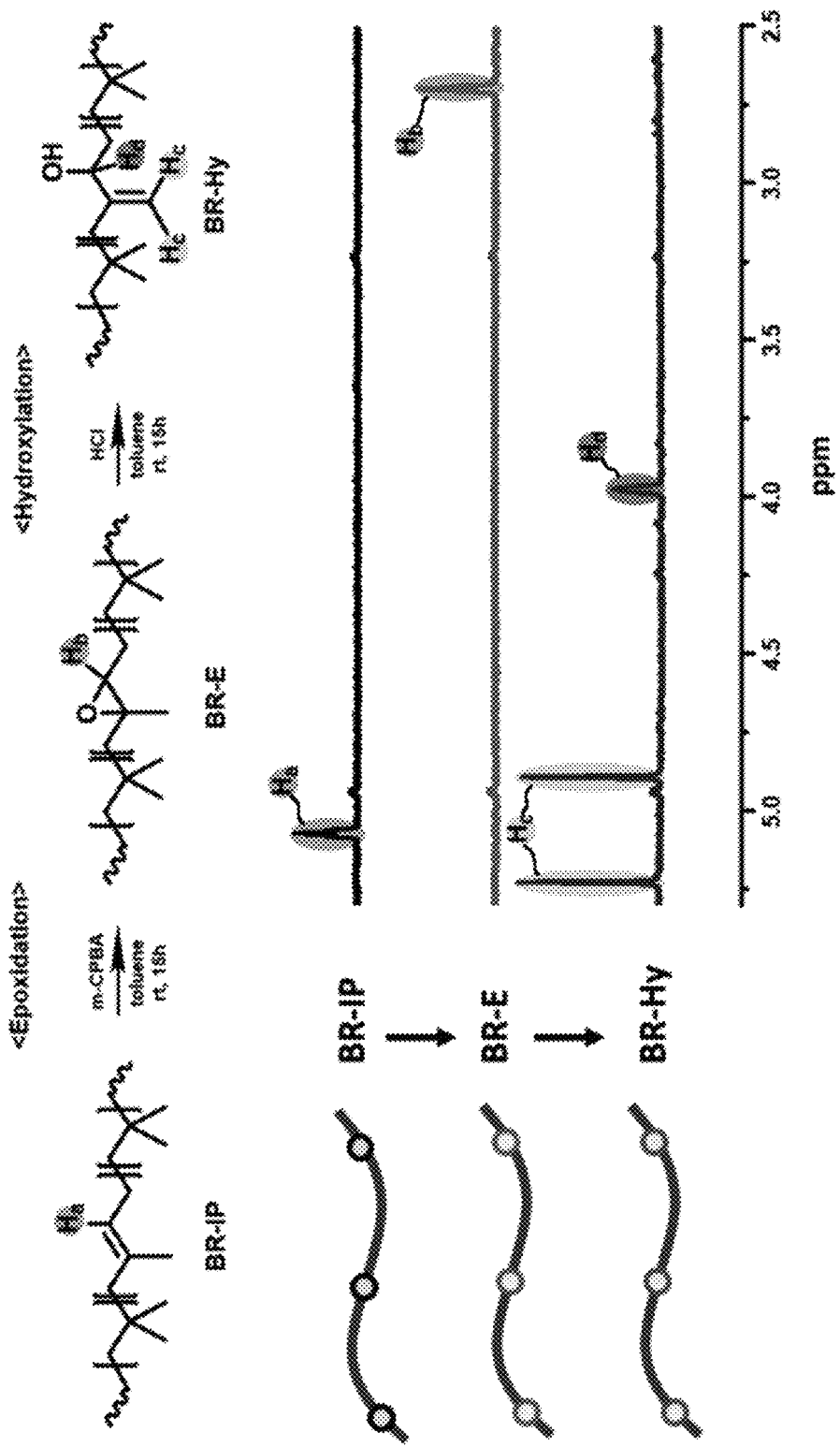

[FIG. 1B]
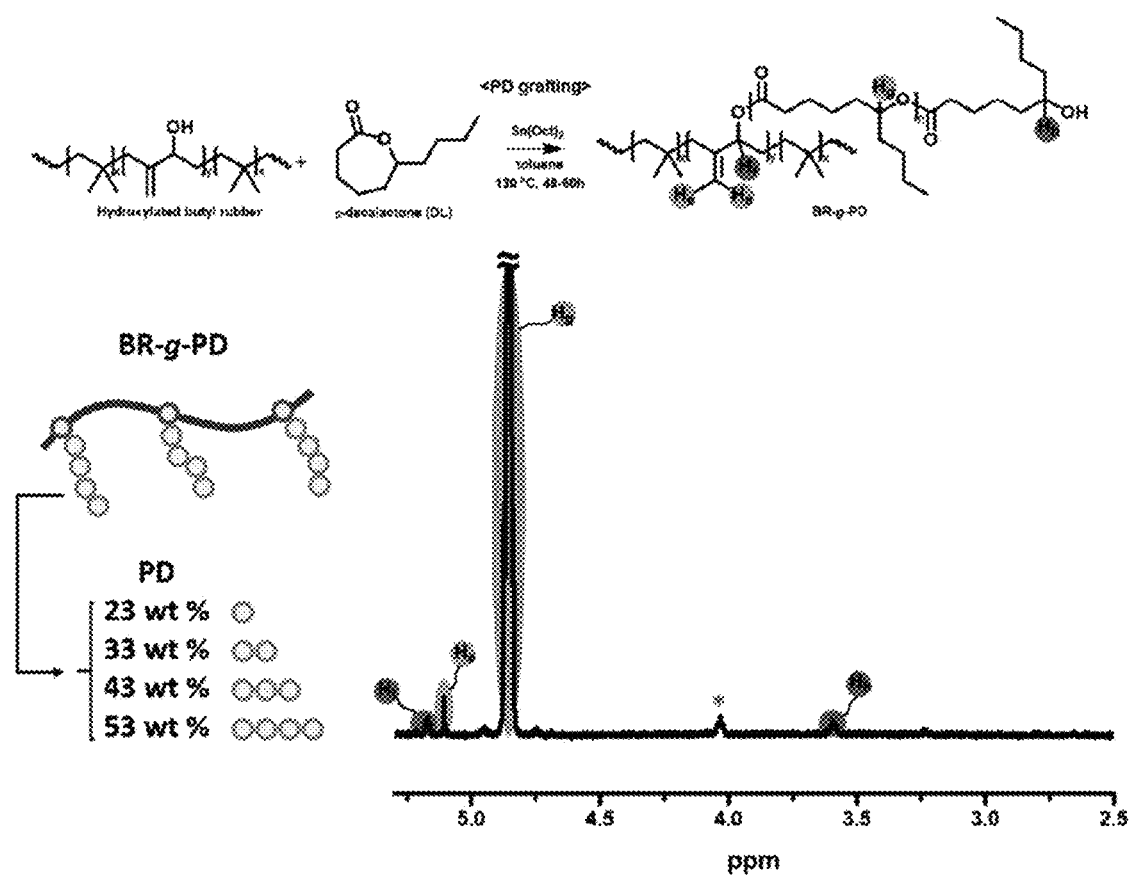

[FIG. 2A]
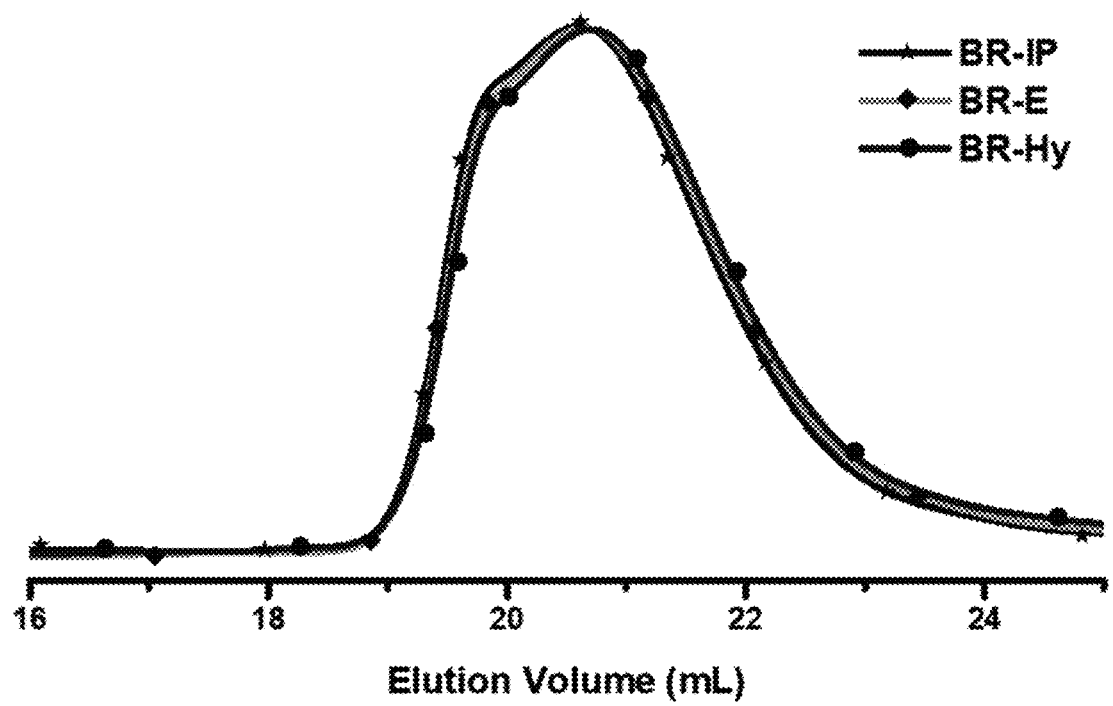
[FIG. 2B]
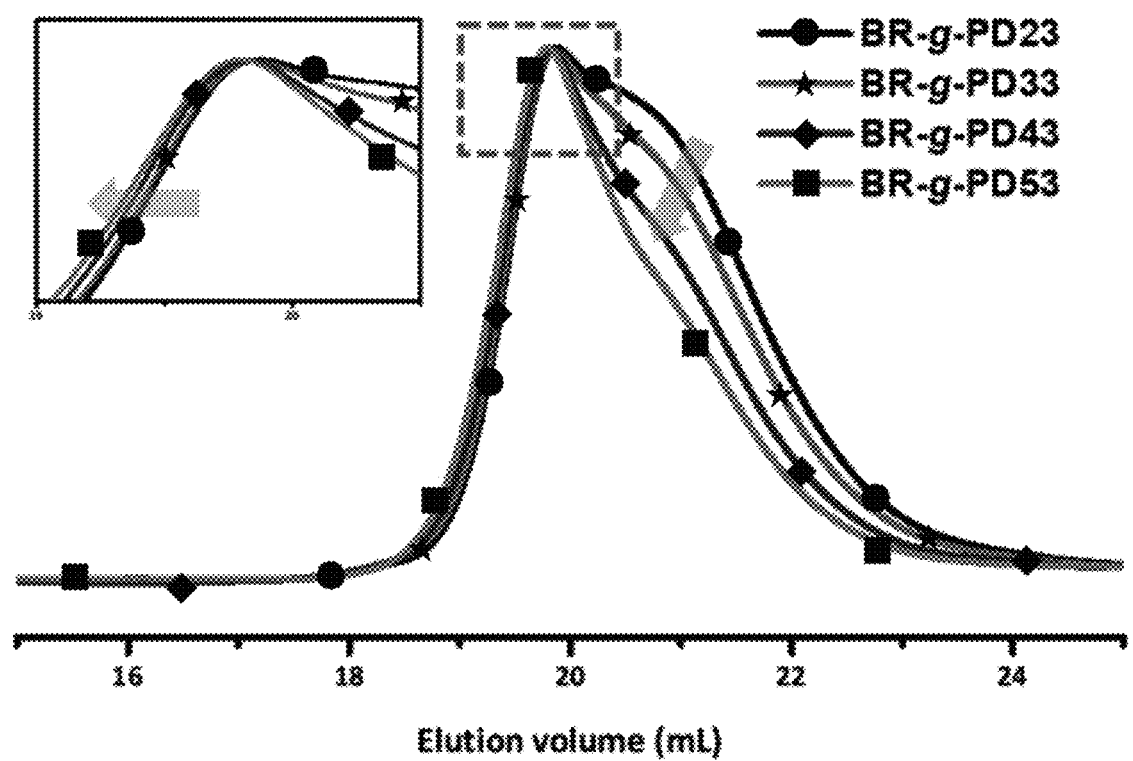

[FIG. 3]
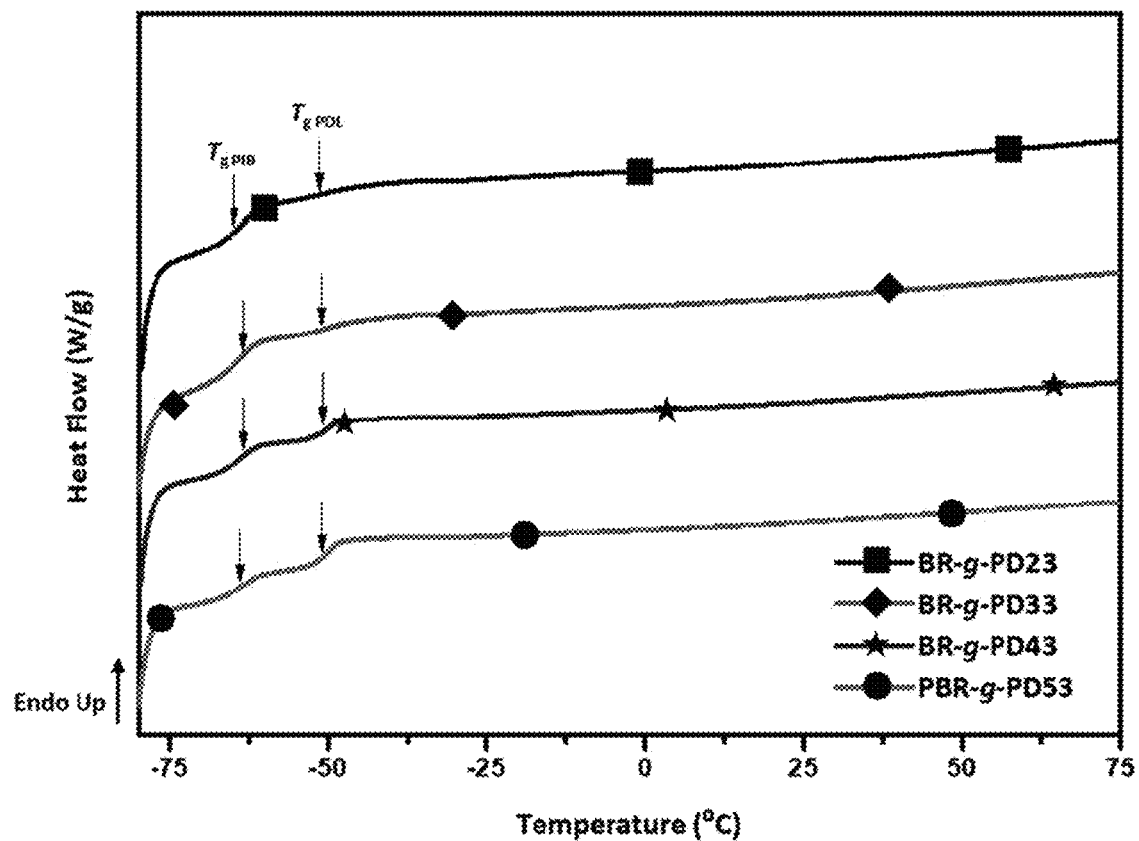

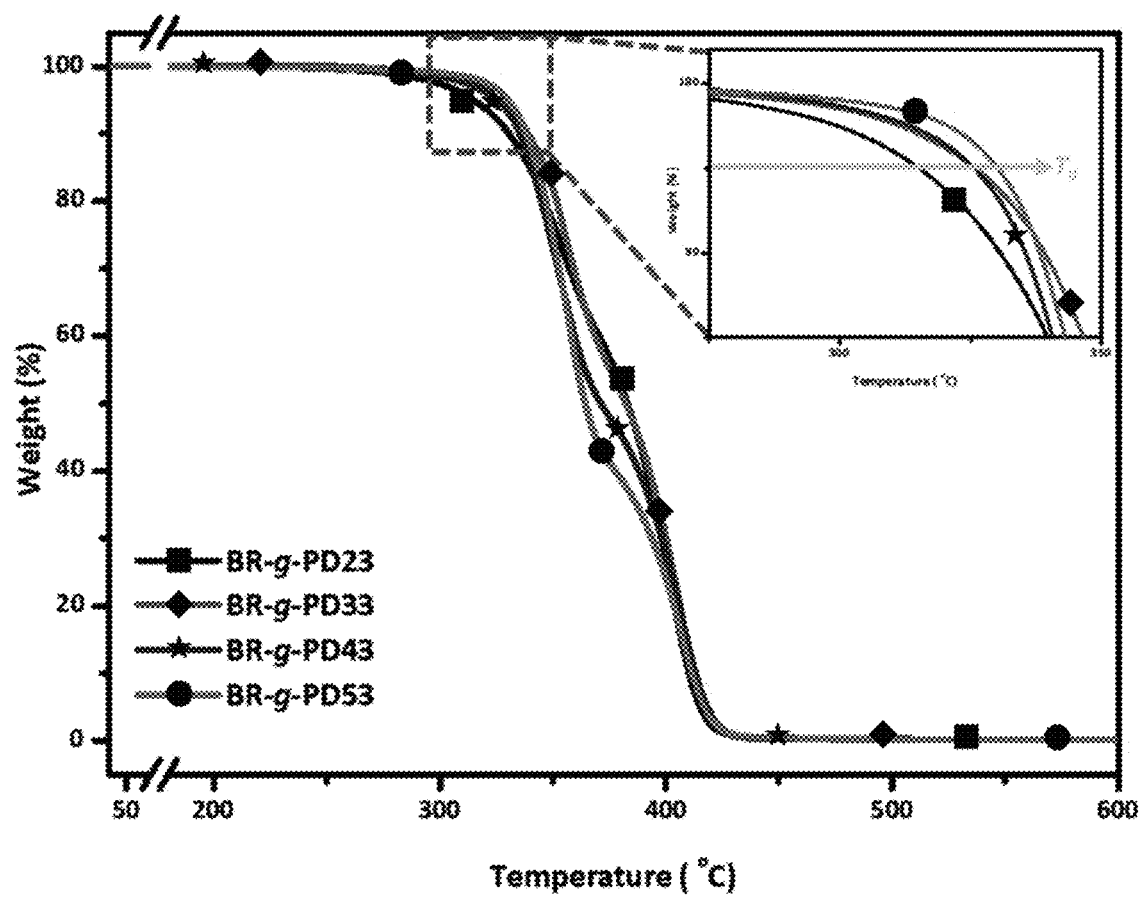
[FIG. 4]

[FIG. 5]
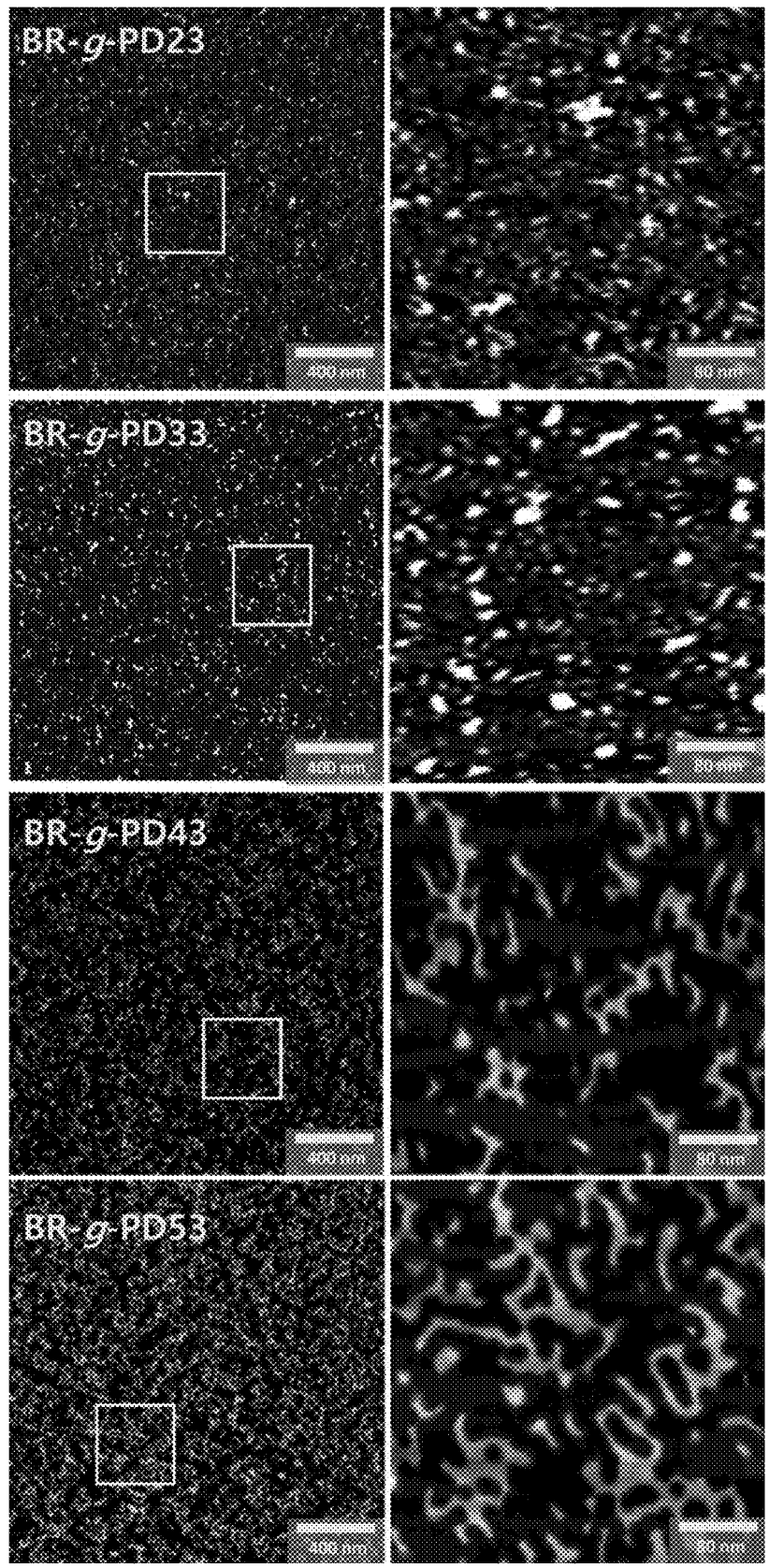

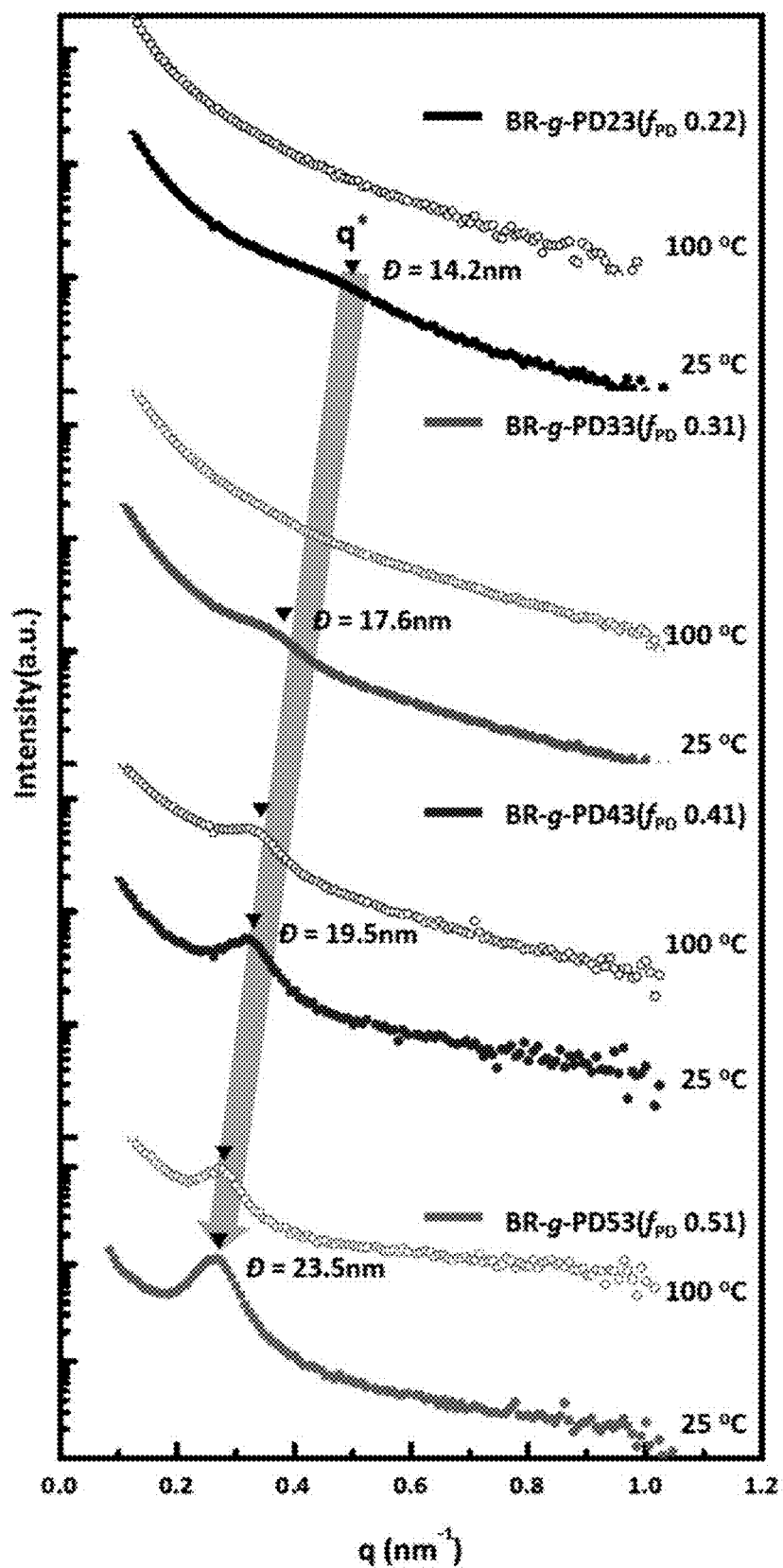
[FIG. 6]

[FIG. 7]
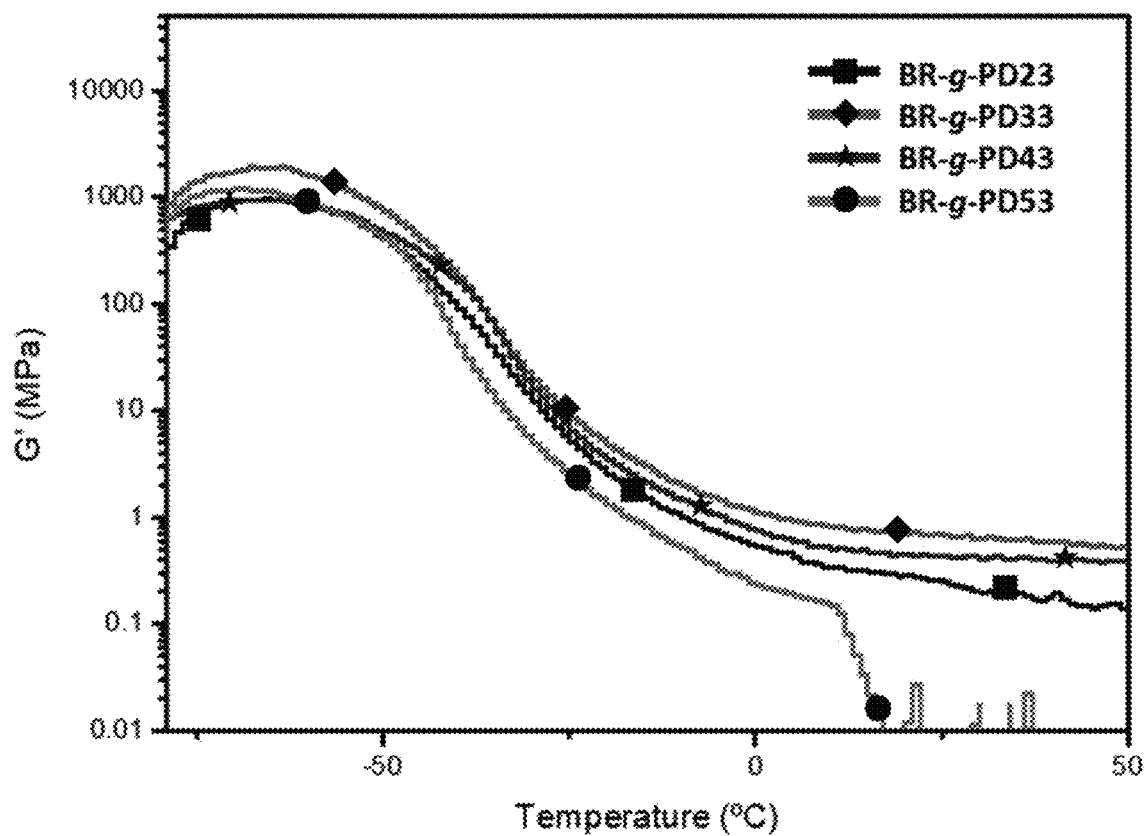

[FIG. 8]
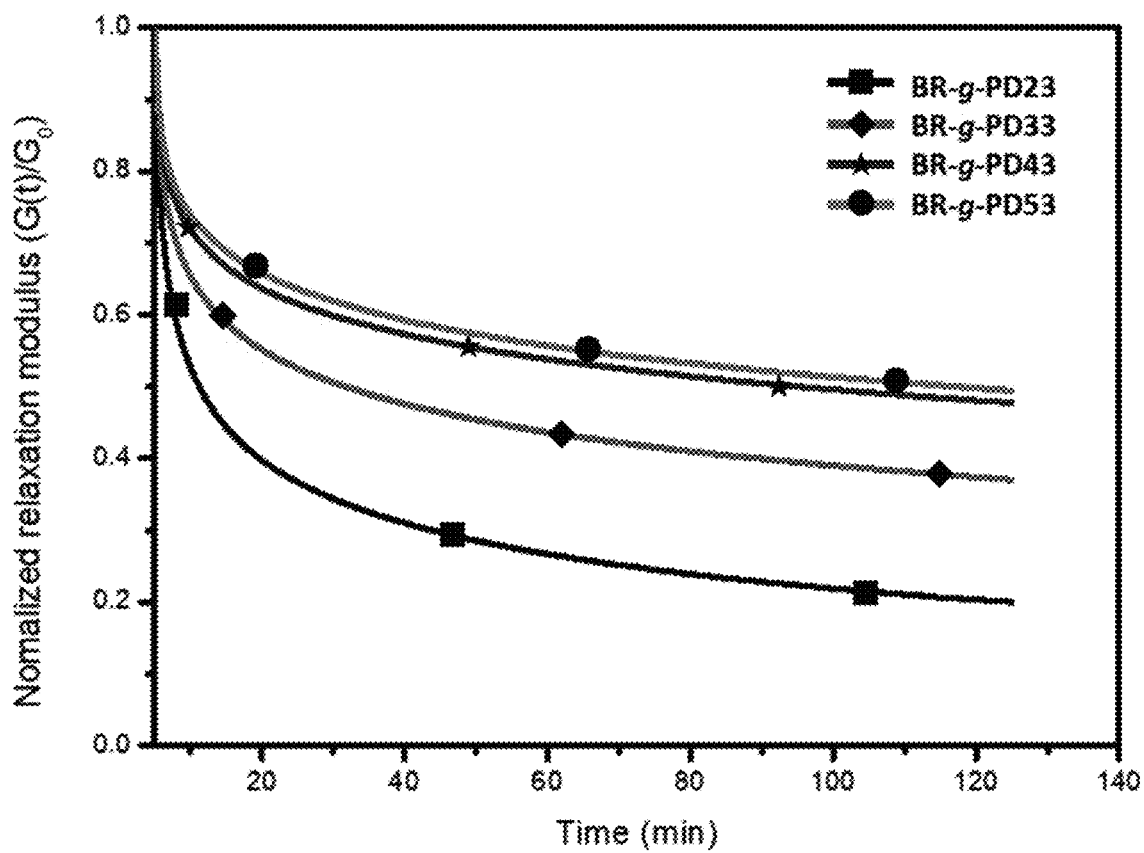

[FIG. 9A]
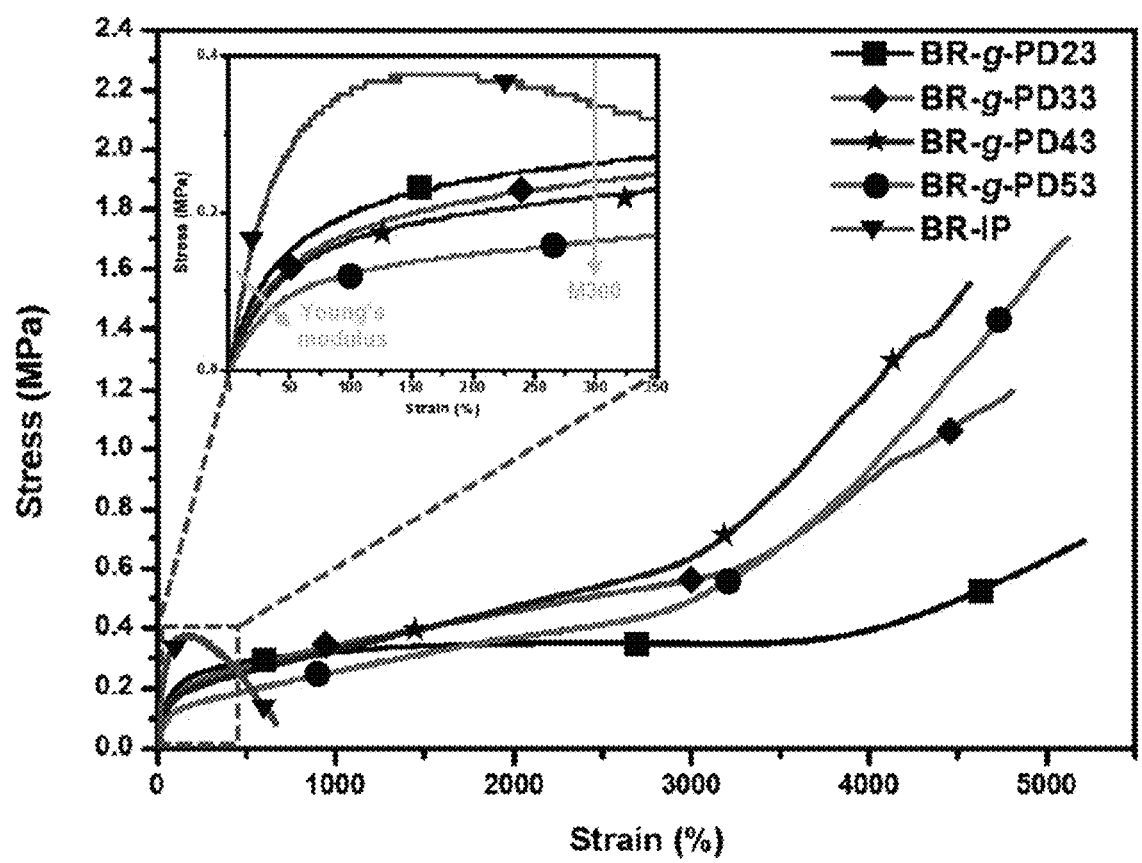

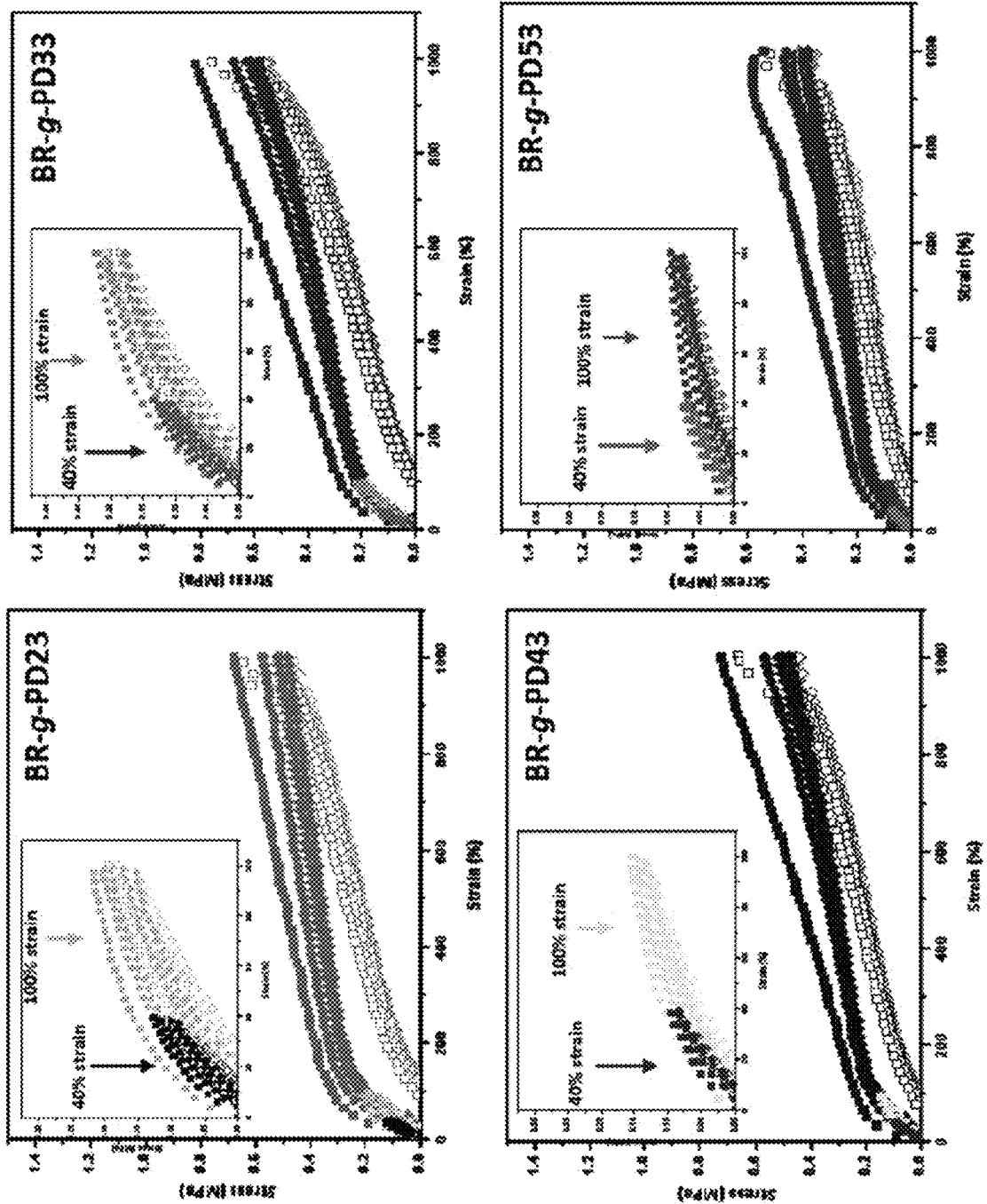
[FIG. 9B]

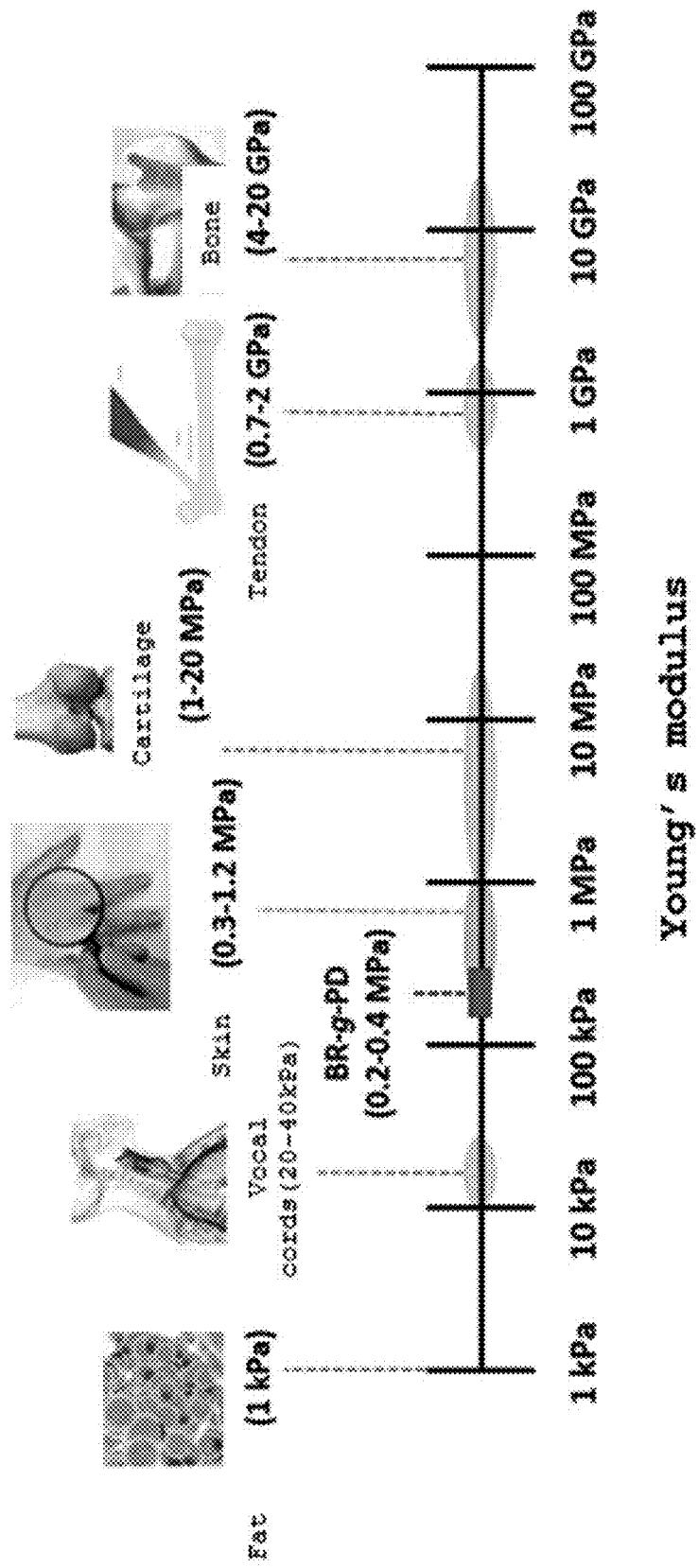
[FIG. 10A]

[FIG. 10B]
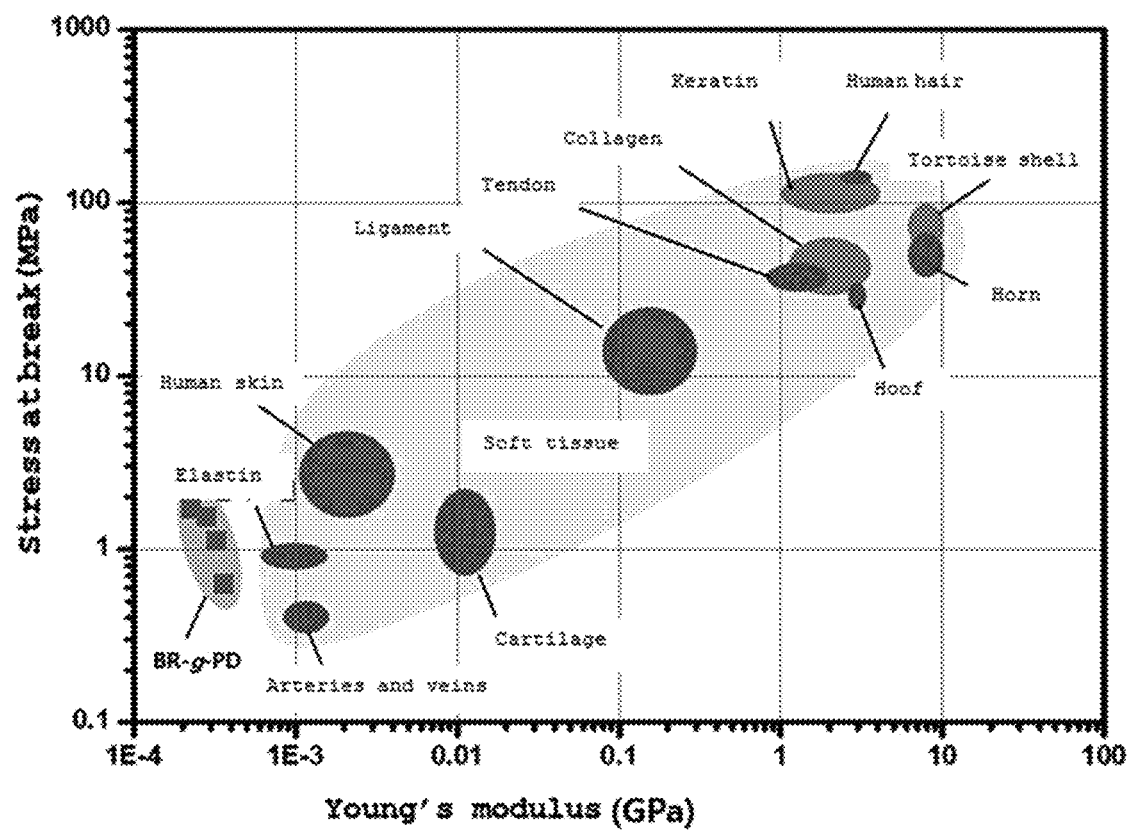

[FIG. 11A]
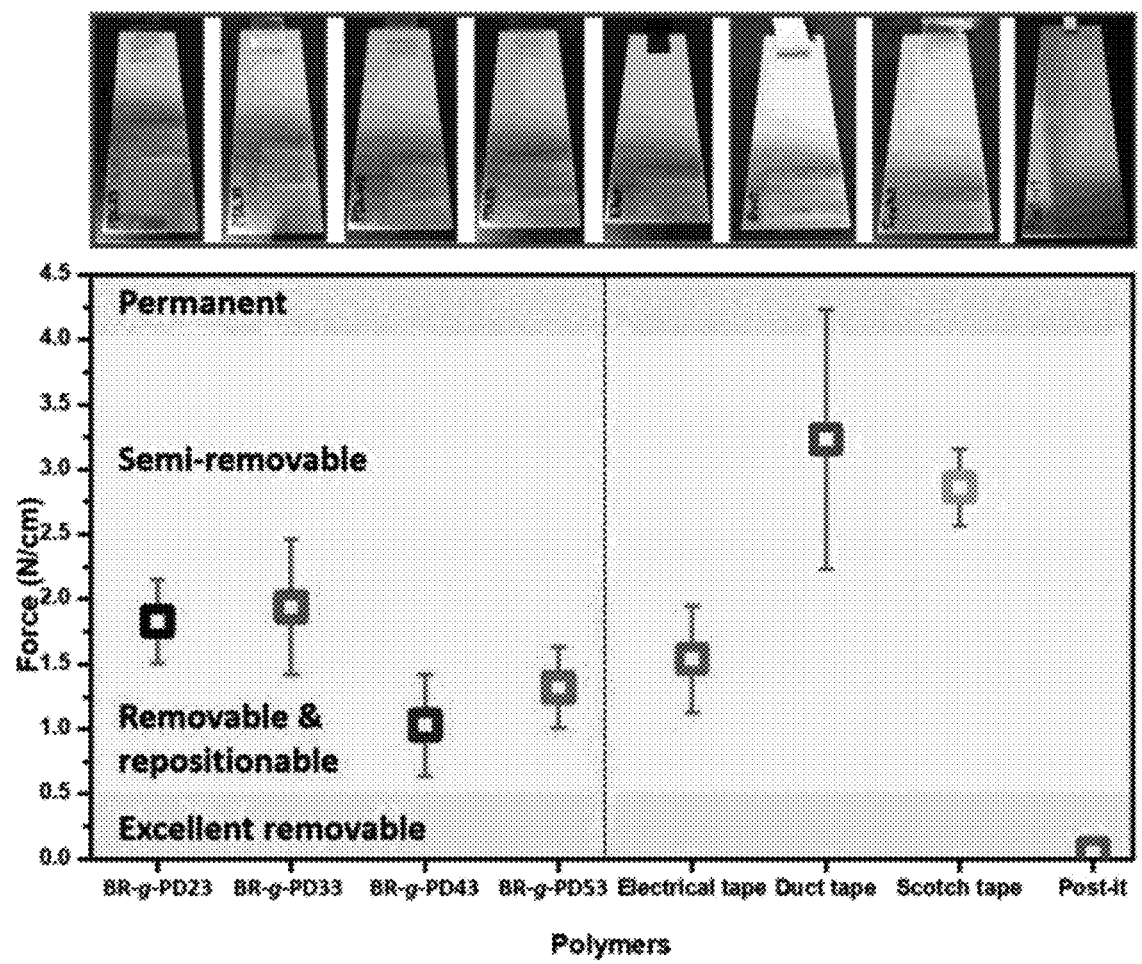

[FIG. 11B]
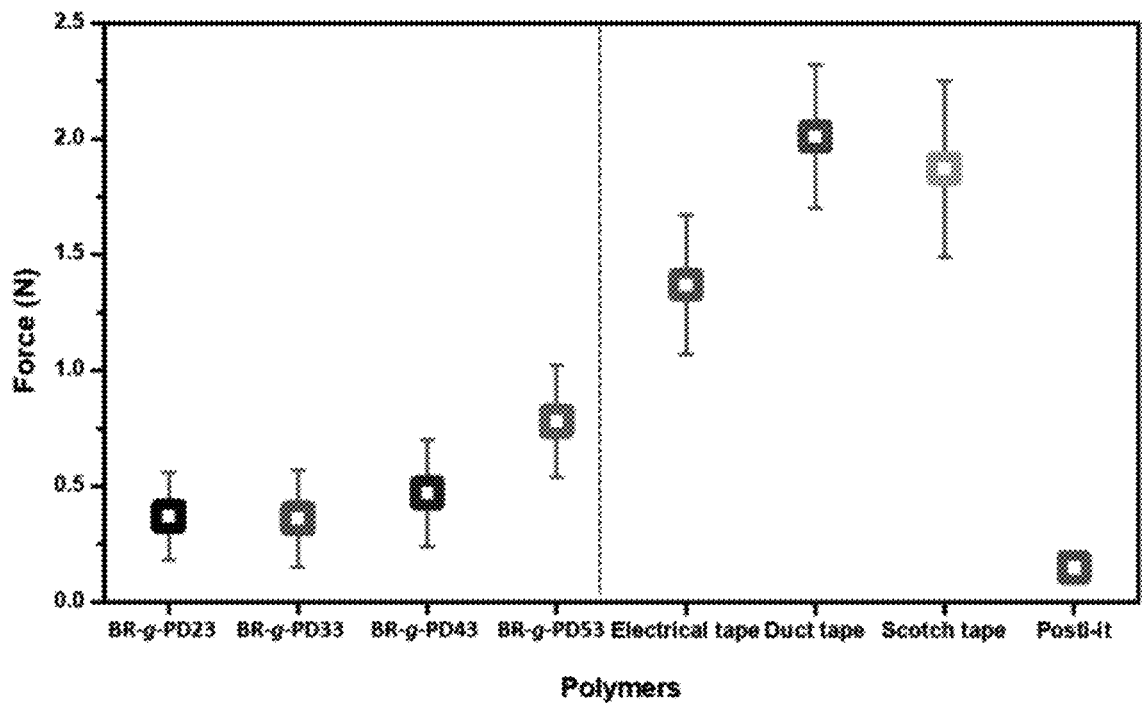
[FIG. 11C]
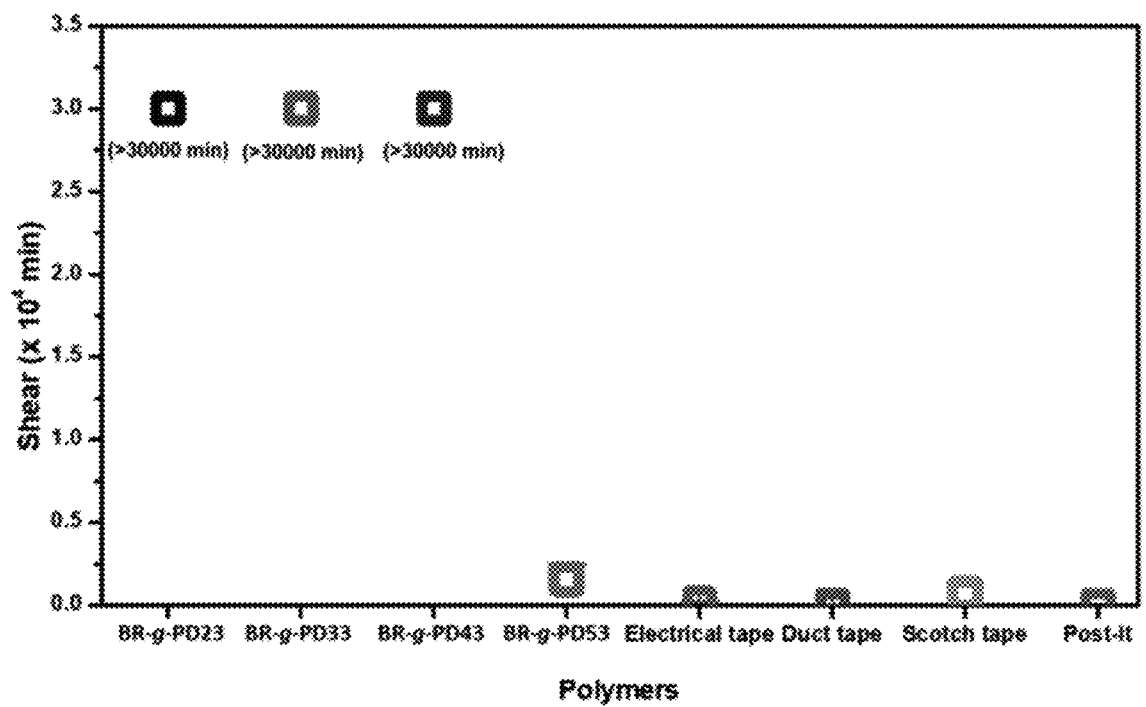

PREPARING METHOD OF SUPERELASTOMER, SUPERELASTOMER PREPARED USING THE SAME, AND MOLDED ARTICLE CONTAINING SUPERELASTOMER

CROSS-REFERENCE TO RELATED APPLICATIONS

This application claims the priority of Korean Patent Application No. 10-2021-0016621 filed on Feb. 5, 2021, in the Korean Intellectual Property Office, the disclosure of which is incorporated herein by reference.

BACKGROUND OF THE INVENTION

Field of the Invention

The present disclosure relates to a preparing method of a superelastomer, a superelastomer prepared using the same, and a molded article containing the superelastomer, and more particularly, to a preparing method of a superelastomer having physical properties suitable for a human soft tissue, a superelastomer prepared using the same, and a molded article containing the superelastomer.

Description of the Related Art

Thermoplastic elastomer (TPE) is an elastomer constituted by only physical crosslinking without chemical crosslinking, and has an advantage of being able to be processed by heating, and has been widely used industrially. In particular, recent studies have been made to synthesize a so-called superelastomer having a strain at break of 2000% or more and excellent elasticity. The superelastomer is advantageous for producing thin elastomer such as surgical gloves and may be used more widely than conventional elastomers for flexible materials such as soft robotics, wearable devices, and the like.

Meanwhile, an elastomer having a low modulus of elasticity of 1 MPa or less may be used as a biomaterial to replace soft tissue of the human body. So far, these biomaterials have been mainly studied in the form of gels. However, the gel has a disadvantage of being unstable and a strain at break is low due to evaporation or elution of the solvent, so that there is a limit to its application.

On the other hand, branched polymer chains such as graft copolymers may exhibit various physical properties depending on the number of side chains, the degree of polymerization of side chains, and the degree of polymerization of a backbone. In addition, the graft copolymer is advantageous in giving a greater strain at break than a linear polymer. This is because the linear polymer has a limitation in strain at break due to chain entanglement. In addition, side chains lower than the critical molecular weight have an effect of swelling a polymer chain like a solvent, thereby lowering the modulus of the polymer. It is suitable for synthesizing an elastomer with a low modulus of elasticity.

In the related art, in order to increase the strain at break of the elastomer without chemical crosslinking, there are cases that the molecular weight of polysilicon is increased, a multi-graft copolymer is synthesized, or a semi-crystalline polymer, PLLA is copolymerized with butyl rubber. However, in the related art, there were disadvantages that the molecular weight is higher than necessary (3000 kg mol$^{-1}$), it is somewhat unsuitable for the human body and the environment by using a petroleum-based monomer, or the elastic modulus and stiffness of the elastomer are large so as not to be suitable for soft tissues.

In the related art, physical crosslinking by phase separation was introduced by copolymerizing a soft material and a hard material, but the present inventors developed a superelastomer with very excellent strain at break and elasticity by introducing physical crosslinking by phase separation by copolymerizing the soft material and the hard material, confirmed the characteristics thereof, and completed the present disclosure.

SUMMARY OF THE INVENTION

An object of the present disclosure is to provide a preparing method of a superelastomer with excellent strain at break and elastic recovery, a superelastomer prepared using the same, and a molded article including the superelastomer.

Another object of the present disclosure is to provide a preparing method of a superelastomer capable of being used as a biomaterial to replace soft tissue, a superelastomer prepared using the same, and a molded article including the superelastomer.

The objects to be solved by the present disclosure are not limited to the aforementioned object(s), and other object(s), which are not mentioned above, will be apparent to those skilled in the art from the following description.

According to an aspect of the present disclosure, there is provided a preparing method of a superelastomer comprising the steps of (a) preparing an initiator represented by the following Chemical Formula 1; and (b) preparing a graft copolymer represented by the following Chemical Formula 2 by ring-opening polymerization of the initiator of step (a) and decalactone:

[Chemical Formula 1]

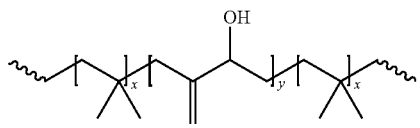

wherein, x is an integer of 1660 to 1680, and y is an integer of 30 to 60,

[Chemical Formula 2]

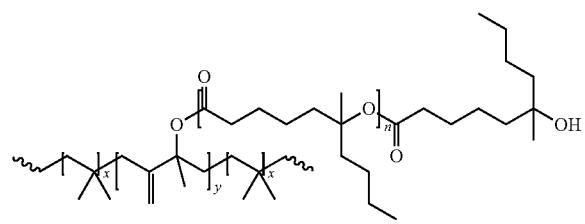

wherein, x is an integer of 1660 to 1680, y is an integer of 30 to 60, and n is an integer of 11 to 42.

In step (a), the initiator may be prepared by substituting isoprene of butyl rubber with an epoxy group and introducing a hydroxyl group.

In step (b), tin (II) 2-ethylhexanoate may be used as a catalyst for ring-opening polymerization.

In step (b), the initiator and decalactone may be ring-opening polymerized by a grafting-from method.

Step (b) may be performed at 100 to 140° C. for 48 to 60 hours.

In step (b), the molecular weight of decalactone may be 23 to 53 wt % with respect to the graft copolymer.

A soft initiator and soft decalactone may be copolymerized.

According to another aspect of the present disclosure, there is provided a superelastomer represented by the following Chemical Formula 2 which is prepared by ring-opening polymerization of an initiator represented by the following Chemical Formula 1 and decalactone:

[Chemical Formula 1]

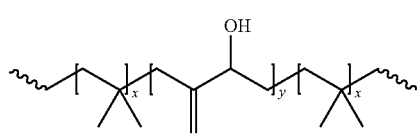

wherein, x is an integer of 1660 to 1680, and y is an integer of 30 to 60,

[Chemical Formula 2]

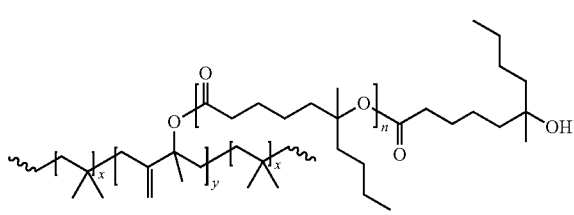

wherein, x is an integer of 1660 to 1680, y is an integer of 30 to 60, and n is an integer of 11 to 42.

The superelastomer may have a decomposition temperature of 310° C. or higher.

The superelastomer may have a strain at break of at least 4000%.

The superelastomer may have a Young's modulus of 1 MPa or less.

According to yet another aspect of the present disclosure, there is provided a molded article containing a superelastomer represented by Chemical Formula 2:

[Chemical Formula 2]

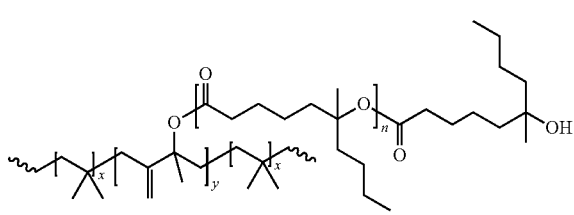

wherein, x is an integer of 1660 to 1680, y is an integer of 30 to 60, and n is an integer of 11 to 42.

According to the present disclosure, the superelastomer has excellent strain at break and elastic recovery, and thus can be used as a biomaterial to replace soft tissue.

Further, according to the preparing method of the present disclosure, there is an advantage of being used in various fields by preparing thermoplastic elastomer capable of realizing desired physical properties by controlling a ratio of soft and hard.

BRIEF DESCRIPTION OF THE DRAWINGS

FIG. 1A is a diagram illustrating an initiator preparation step according to an embodiment of the present disclosure and a graph showing comparing 1H-NMR spectrum results of butyl rubber (BR-IP), epoxidized butyl rubber (BR-E), and hydroxyl group-introduced butyl rubber (BR-Hy) and FIG. 1B is a diagram illustrating a graft copolymer preparing step according to an embodiment of the present disclosure and a graph showing a 1H-NMR spectrum result of a prepared graft copolymer (BR-g-PD).

FIG. 2A is a graph showing comparing size exclusion chromatography (SEC) analysis results of butyl rubber (BR-IP), epoxidized butyl rubber (BR-E), and hydroxyl group-introduced butyl rubber (BR-Hy) according to an embodiment of the present disclosure and FIG. 2B is a graph showing comparing size exclusion chromatography (SEC) analysis results of graft copolymers (BR-g-PD23, BR-g-PD33, BR-g-PD43, and BR-g-PD53) according to an embodiment of the present disclosure.

FIG. 3 illustrates a differential scanning calorimeter (DSC) heat flow curve of the graft copolymers (BR-g-PD23, BR-g-PD33, BR-g-PD43, and BR-g-PD53) according to an embodiment of the present disclosure.

FIG. 4 illustrates a thermal gravimetric analysis (TGA) pyrolysis curve of the graft copolymers (BR-g-PD23, BR-g-PD33, BR-g-PD43, and BR-g-PD53) according to an embodiment of the present disclosure.

FIG. 5 illustrates high-speed atomic force microscopy (AFM) images of the graft copolymers (BR-g-PD23, BR-g-PD33, BR-g-PD43, and BR-g-PD53) according to an embodiment of the present disclosure.

FIG. 6 illustrates small angle X-ray scattering (SAXS) data of the graft copolymers (BR-g-PD23, BR-g-PD33, BR-g-PD43, and BR-g-PD53) according to an embodiment of the present disclosure.

FIG. 7 illustrates a storage modulus graph of the graft copolymers (BR-g-PD23, BR-g-PD33, BR-g-PD43, and BR-g-PD53) according to an embodiment of the present disclosure.

FIG. 8 illustrates stress relaxation test results of the graft copolymers (BR-g-PD23, BR-g-PD33, BR-g-PD43, and BR-g-PD53) according to an embodiment of the present disclosure.

FIG. 9A illustrates stress at break testing results of the graft copolymers (BR-g-PD23, BR-g-PD33, BR-g-PD43, and BR-g-PD53) according to an embodiment of the present disclosure and FIG. 9B illustrates five-repeated load testing results of the graft copolymers (BR-g-PD23, BR-g-PD33, BR-g-PD43, and BR-g-PD53).

FIG. 10A illustrates comparison in Young's modulus of the graft copolymers (BR-g-PD23, BR-g-PD33, BR-g-PD43, and BR-g-PD53) according to an embodiment of the present disclosure and bio-tissues and FIG. 10B illustrates comparison in Young's modulus-stress at break of the graft copolymers (BR-g-PD23, BR-g-PD33, BR-g-PD43, and BR-g-PD53) and bio-tissues.

FIG. 11A illustrates results of a 180° peel test of the graft copolymers (BR-g-PD23, BR-g-PD33, BR-g-PD43, and BR-g-PD53) according to an embodiment of the present disclosure, FIG. 11B illustrates results of an initial probe tack test of the graft copolymers (BR-g-PD23, BR-g-PD33, BR-g-PD43, and BR-g-PD53), and FIG. 11C illustrates results of a shear test of the graft copolymers (BR-g-PD23, BR-g-PD33, BR-g-PD43, and BR-g-PD53).

DETAILED DESCRIPTION OF THE PREFERRED EMBODIMENT

In the following description, only parts required to understand embodiments of the present disclosure will be described, and it should be noted that the description of other parts will be omitted within a range without departing from the gist of the present disclosure.

Terms and words used in the present specification and claims should not be interpreted as being limited to typical or dictionary meanings, but should be interpreted as meanings and concepts which comply with the technical spirit of the present disclosure, based on the principle that the present inventor can appropriately define the concepts of the terms to describe his/her own invention in the best manner. Therefore, the exemplary embodiments described in the present specification and the configurations illustrated in the drawings are merely the most preferred embodiment of the present disclosure and are not intended to represent all of the technical ideas of the present disclosure, and thus, it should be understood that various equivalents and modifications capable of replacing the exemplary embodiments at the time of this application.

Hereinafter, the present disclosure will be described in detail.

Preparing Method of Superelastomer

The present disclosure provides a preparing method of a superelastomer of comprising the steps of (a) preparing an initiator represented by the following Chemical Formula 1; and (b) preparing a graft copolymer represented by the following Chemical Formula 2 by ring-opening polymerization of the initiator of step (a) and decalactone:

[Chemical Formula 1]

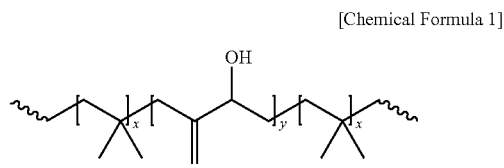

wherein, x is an integer of 1660 to 1680, and y is an integer of 30 to 60,

[Chemical Formula 2]

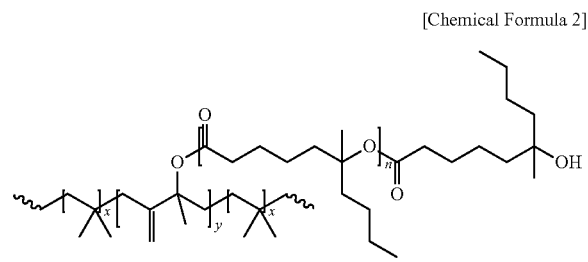

wherein, x is an integer of 1660 to 1680, y is an integer of 30 to 60, and n is an integer of 11 to 42.

The present disclosure was intended to synthesize a superelastomer having a low modulus of elasticity to be used as a soft biological tissue, and having very excellent strain at break and elastic recovery.

Butyl rubber has excellent gas barrier properties and chemical resistance, and is an FDA-approved material that is harmless to the human body. Because of these characteristics, butyl rubber has been applied for medical purposes such as blood bags and artificial blood vessels. Recently, research has been conducted to copolymerize such butyl rubber with aliphatic polyester to be applied to the medical industry.

On the other hand, aliphatic polyester has an advantage of being mostly harmless to the human body, which can be used in biomedical fields such as drug delivery materials. Accordingly, a lot of research has been done to be used in biomedical and biomaterial fields in the form of elastomers copolymerized with aliphatic polyesters such as PL(L)A, PCL, and PVL. Among them, poly(ε-decalactone) ($T_g=-50°$ C., amorphous polymer) has no crystallinity and is rubbery even at room temperature because $T_g$ is lower than room temperature, and ε-decalactone is a material obtained from castor oil has environmentally friendly and biocompatibility.

Conventional thermoplastic elastomers are mixtures of soft and hard materials, but unlike this, the material used in the present disclosure has a soft feature because both butyl rubber and decalactone are rubbery at room temperature. The superelastomer according to the present disclosure exhibits the characteristics of a superelastomer having high flexibility and high strain at break, due to physical cross-linking caused by phase separation between two phases, even though soft and soft materials are copolymerized.

(a) Initiator Preparation Step

Reaction Formula 1 below is a reaction formula showing a process for preparing the initiator represented by Chemical Formula 1 from butyl rubber.

[Reaction Formula 1]

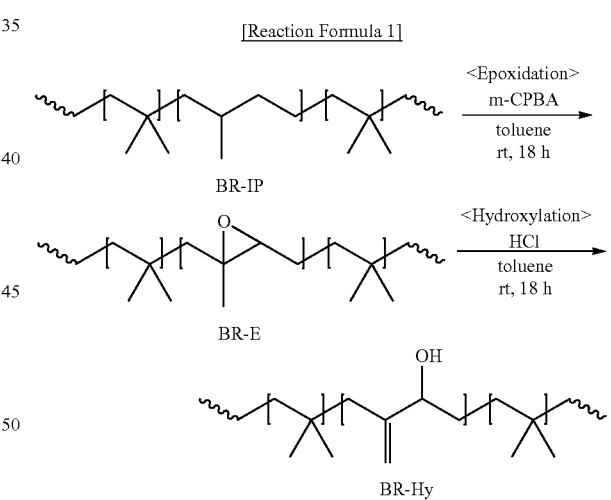

Referring to Reaction Formula 1, the initiator represented by Chemical Formula 1 may be prepared by substituting isoprene of butyl rubber with an epoxy group and introducing a hydroxyl group.

First, isoprene contained in butyl rubber is substituted with an epoxy group by epoxidating butyl rubber to prepared epoxidized butyl rubber.

The epoxidation may be performed in an organic solvent selected from the group consisting of aromatic hydrocarbons, aliphatic hydrocarbons, and halogenated aliphatic hydrocarbons. The organic solvent is required in a liquid state at the epoxidation temperature, and may be required to dissolve or mixed with the reactant and the product.

Examples of the aromatic hydrocarbon include benzene, toluene, xylene, cumene, ethylbenzene, chlorobenzene, mesitylene, t-butylbenzene, and mixtures thereof, but are not limited thereto.

As the aliphatic hydrocarbon, C5 to C10 linear, branched and cyclic aliphatic hydrocarbons and mixtures thereof may be used. Examples of the aliphatic hydrocarbon may use pentane, hexane, heptane, octane, nonane, decane, 2-methyl butane (isopentane), 2,2,4-trimethyl pentane (isooctane), cyclohexane, methyl cyclohexane, 2-methyl pentane (isohexane), 2,2-dimethylhexane, 2,5-dimethylhexane, 2-methylheptane, 4-methineheptane, etc.

The halogenated aliphatic hydrocarbon includes methylene chloride, dichloroethane, chloroform, carbon tetrachloride, trichloroethane, tetrachloroethane, chloropropane, dichloropropane, trichloropropane, and mixtures thereof, but is not limited thereto.

The epoxidation may be performed using m-chloroperoxybenzoic acid (m-CPBA).

Hydrochloric acid (HCl) is added to the epoxidized butyl rubber to prepare an initiator represented by the following Chemical Formula 1 in which an epoxy group is substituted with a hydroxyl group (—OH).

(b) Graft Copolymer Preparation Step

Reaction Formula 2 below is a reaction formula showing a process for preparing a graft copolymer represented by Chemical Formula 2 by ring-opening polymerization of the initiator represented by Chemical Formula 1 and decalactone.

reacting monomers of branch molecules with a backbone to increase the length of the branch molecules. The grafting-to method has an advantage of uniformly adjusting a molecular weight of the branch molecule, but has a problem that it is difficult to graft all of the branch molecules to a grafting point. However, when the grafting-from method is used, it is difficult to uniformly control the molecular weight by making the length of the branch molecules regular, but all branch molecules may be grafted to the grafting point. In the preparation method according to an embodiment of the present disclosure, there is an advantage that since decalactone is grafted to the hydroxyl group (—OH) of butyl rubber by a grafting from method, a target amount of decalactone may be grafted to the butyl rubber initiator.

The ring-opening polymerization may be performed by adding the decalactone and the initiator represented by Chemical Formula 1 to a reactor, adding a catalyst, and then heating and stirring the mixture. The step may be performed at 100 to 140° C. for 48 to 60 hours. When the temperature and time are lower than the range, the ring-opening polymerization hardly occurs, and when the temperature and time are higher, there is a problem that side reactions occur.

The molecular weight of the decalactone may be prepared to be 23 to 53 wt % with respect to the graft copolymer. When the molecular weight of decalactone is lower than the range, it is difficult to expect elastomeric properties because a sufficient molecular weight for chain entanglement is not achieved and domain formation is difficult, and when the molecular weight is higher than the range, there is a problem

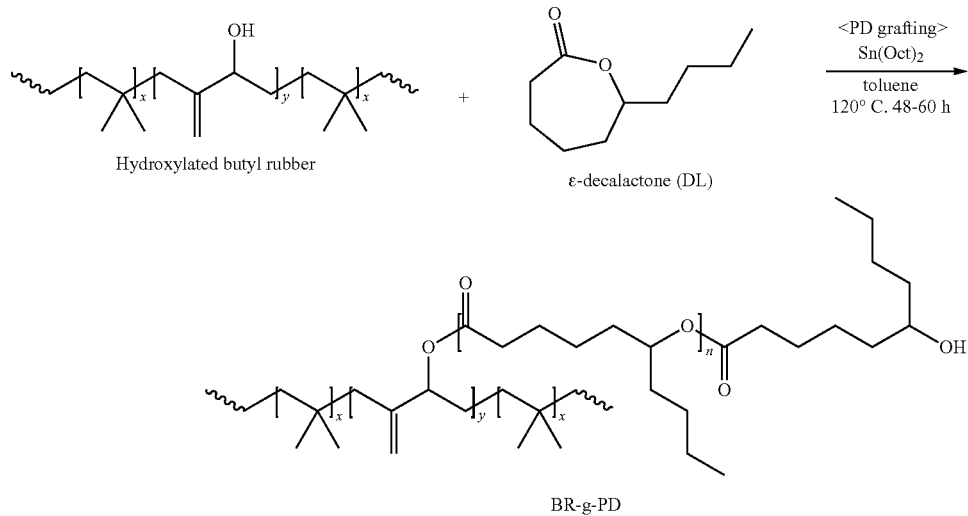

[Reaction Formula 2]

Referring to Reaction Formula 2, a butyl rubber copolymer grafted with polydecalactone may be prepared by ring-opening polymerization of a butyl rubber initiator introduced with a hydroxyl group and decalactone under a catalyst.

The catalyst may be tin (II) 2-ethylhexanoate (Sn(Oct)$_2$), dioctyltin dilaurate, preferably tin (II) 2-ethylhexanoate (Sn(Oct)$_2$).

The decalactone may be ring-opening polymerized with the initiator through a grafting-from method. In the grafting method, there are a grafting-to method of pre-polymerizing branch molecules and then attaching the polymerized branch molecules to a backbone, and a grafting from method of in that a ratio of butyl rubber is relatively reduced and thus, an initial Young's modulus of a mechanical property is lowered.

The step of purifying and drying the graft copolymer represented by Chemical Formula 2 prepared as described above in methanol to obtain a superelastomer may be added.

Superelastomer

The present disclosure provides a superelastomer represented by the following Chemical Formula 2 which is prepared by ring-opening polymerization of an initiator represented by the following Chemical Formula 1 and decalactone:

[Chemical Formula 1]

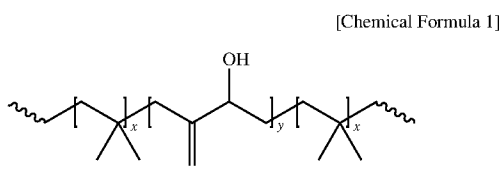

wherein, x is an integer of 1660 to 1680, and y is an integer of 30 to 60,

[Chemical Formula 2]

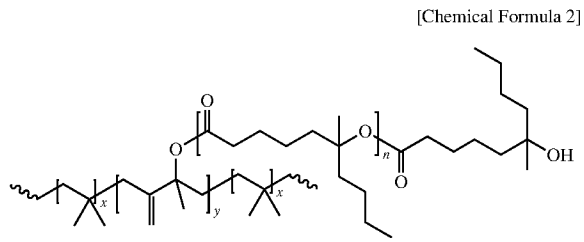

wherein, x is an integer of 1660 to 1680, y is an integer of 30 to 60, and n is an integer of 11 to 42.

The superelastomer may exhibit a decomposition temperature of 310° C. or higher.

The superelastomer may exhibit a strain at break of at least 4000%.

The superelastomer may have a Young's modulus of 1 MPa or less.

The superelastomer according to the present disclosure is stable to heat, has excellent strain at break and elastic recovery, and may be used as a biomaterial to replace soft tissue.

Molded Article Containing Superelastomer

The present disclosure provides a molded article containing a superelastomer represented by Chemical Formula 2.

[Chemical Formula 2]

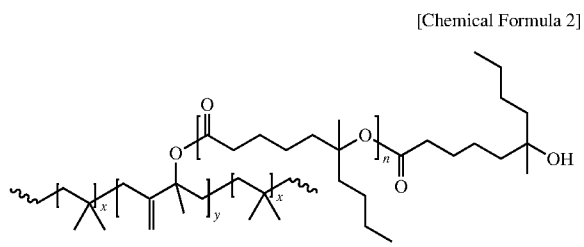

wherein, x is an integer of 1660 to 1680, y is an integer of 30 to 60, and n is an integer of 11 to 42.

EXAMPLES

Hereinafter, the present disclosure will be described in detail with reference to Examples for specific description. However, Examples according to the present disclosure may be modified in various forms, and it is not interpreted that the scope of the present disclosure is limited to the following Examples. Examples of the present disclosure will be provided for more completely explaining the present disclosure to those skilled in the art.

<Materials>

Butyl rubber LANXESS Butyl 100 ($M_n$=190 kg mol$^{-1}$, PDI value=1.64, isoprene content=0.88 mol %) manufactured by LANXESS was used. In order to introduce hydroxyl groups into butyl rubber, m-chloroperbenzoic acid (m-CPBA, ≤77%, Sigma-Aldrich), anhydrous sodium sulfate ($Na_2SO_4$, 98.5%, Sigma-Aldrich), hydrochloric acid (HCl, 35-37%, Samchun Chemicals) were used without purification.

To make a graft copolymer, decalactone (ε-decalactone, ≥99%) (DL) purchased from Sigma-Aldrich was added with calcium hydride ($H_2Ca$, 95%, Sigma-Aldrich) and used after purification 3 times. In this case, anhydrous toluene (99.8%, Alfa Aesar) was used as a solvent, and tin octoate ($Sn(Oct)_2$, Tin (II) 2-ethylhexanoate, 92.5-100%) was purchased from Sigma-Aldrich as a ring opening polymerization catalyst and used after purification 3 times.

Other solvents were manufactured by Duksan Company and used without purification.

<Analysis Method>

$^1$H NMR (proton nuclear magnetic resonance) and SEC (size-extrusion chromatography) were used to analyze the chemical structure, molecular weight, and content of a graft copolymer polymerized with a product of each step of introducing a hydroxyl group of butyl rubber. $^1$H NMR (Avance 700 MHz NMR, Bruker) was analyzed by dissolving a polymer in deuterochloroform ($CDCl_3$), and SEC (Agilent 1260 LC, Agilent) was analyzed by dissolving the polymer in tetrahydrofuran (THF, HPLC grade, stablized). At this time, the molecular weight was a value calculated by calibrating through polystyrene standards (PS standards).

The thermal characteristic analysis of the graft copolymer were performed using differential scanning calorimetry (DSC) and thermogravimetric analysis (TGA). The DSC was heated from room temperature to 200° C. under nitrogen conditions at a heating rate of 10° C. min$^{-1}$, cooled to −80° C. at a rate of 60° C. min$^{-1}$, and then heated to 200° C. at 10° C. min$^{-1}$ again. At this time, the calorie value in a second heating process was observed to measure a glass transition temperature ($T_g$) of the polymer. The thermal decomposition behavior of the polymer was observed using TGA under a nitrogen condition while the temperature was increased from room temperature to 600° C. at a rate of 10° C. min$^{-1}$.

The phase separation morphology of the graft copolymer was observed through atomic force microscopy (AFM) and synchrotron-based small-angle X-ray scattering (SAXS). In the AFM, the surface was observed by spin-coating a polymer on a Si wafer at 3000 rpm. The SAXS was performed in the Pohang Accelerator Center (PAL). After annealing the polymer film in a vacuum oven at room temperature for 24 hours, a structure of the polymer was analyzed at room temperature and 100° C. At this time, the energy of X-ray was 10.975 keV and a distance between a sample and a detector was 6.5 m. At this time, on the SAXS, a domain size was obtained by substituting the following Equation obtaining a scattering vector (q).

$$q = \frac{4\pi}{\lambda} \times \sin\left(\frac{\theta}{2}\right)$$

In this case, θ is a scattering angle.

Dynamic mechanical analysis (DMA) was analyzed using DMA (Q800, WATERS, USA). At this time, a film-type polymer sample was transformed with a frequency of 1 Hz and an amplitude of 1 μm, and the temperature was increased from −80° C. to 200° C. at 3° C. min$^{-1}$. A stress relaxation test was a value that measured the degree of stress relaxation for 2 hours while maintaining the stress after stretching to 80%.

The mechanical properties of the polymer were confirmed through a tensile test. The polymer was made into a dog-bone-shaped film of ASTMD1708 standard with a thickness of about 0.8 to 0.9 mm through a solution casting method. The tensile rate was 130 mm min$^{-1}$, and the stress at break was measured by attaching a 100N load cell. The repeated load test was performed 5 times at a tensile rate of 500 mm min$^{-1}$. At this time, a specimen returned after loading was relaxed for 20 minutes, and then the next load was applied again. In particular, the elasticity after stretching to 1000% was obtained through the following Equation.

$$\text{Elasticity (\%)} = \frac{\text{Total strain} - \text{Residual strain}}{\text{Total strain}} \times 100$$

Adhesion was confirmed through a 180° peel test, an initial probe tack test, and a shear test. At this time, a solution obtained by dissolving a polymer in chloroform at 10% w/v was coated on a PET film having a thickness of 50 μm using a wire rod (rod size no. 56) and a drawdown caster. Thereafter, an adhesive sample was prepared by blowing off the solvent at 100° C. for 10 minutes. After this sample was left in a desiccator at room temperature for 24 hours, the 180° peel test was performed by cutting a film to 1 inch width and the shear test was performed by cutting a film to 0.5 inch width.

The 180° peel test was measured by a ASTM D3330 test method with a 180° Peel Adhesive Testing Machine (PA-1000-180-ChemInstruments, Inc.). At this time, the peeling rate was 305 mm min$^{-1}$, and a PET coating sample was attached to a Pressure-Sensitive Tape Counsil, PSTC-grade polished stainless steel test panel (ASTM A666) and rolled 20 times with a 4.5 lb ASTM quality hand roller to measure the strength at the time of peeling. The initial probe tack test was performed using an Inverted Probe Machine with Polyken™ Probe Tack (PT-1000, ChemInstruments, Inc) according to an ASTM D2979 test method. After contacting the adhesive film for 1 second with a probe film having a diameter of 5 mm, the adhesive strength was measured while removing the adhesive film at 610 mm min$^{-1}$. The shear test was measured by an ASTM D3654 test method using a Room Temperature 10 bank Shear Tester (SS-RT-10, ChemInstruments, Inc.). The adhesive film was attached to the PSTC-grade polished stainless steel test panel by 0.5×0.5 inch and then rolled 5 times with a 4.5 lb ASTM quality hand roller. Then, a 500 g weight was attached to the end of the adhesive film to measure a time taken until the adhesive film was detached.

<Example 1> Synthesis of BR-g-PD23

(1) Synthesis of Macroinitiator

After dissolving butyl rubber in toluene to 3.3% w/v, a solution of acetone:toluene=2:1 v/v was purified at least once (BR-IP).

The purified butyl rubber was re-dissolved in toluene at the same concentration. After 5 equivalents of m-CPBA of an isoprene unit was dissolved in toluene, anhydrous sodium sulfate was added to remove moisture, and anhydrous sodium sulfate was filtered through a paper filter. The filtered m-CPBA solution was put in a solution of butyl rubber and stirred at room temperature for 15 hours. The reacted solution was purified twice in the same manner as described above (BR-E).

The purified product was dissolved in toluene at 3.3% w/v, and 2 equivalents of HCl was added thereto. After the reaction by stirring the mixture at room temperature for 15 hours, the mixture was purified twice in the same manner. If necessary, the mixture was purified once more. The purified product was dried in a vacuum oven at 45° C. for 24 hours or more until the solvent was fully removed. The dried product was used as a macroinitiator in graft copolymer synthesis (BR-Hy). (Yield: 87 to 94%)

(2) Synthesis of Graft Copolymer

The dried macroinitiator reacted under nitrogen in a glove box. The macroinitiator was dissolved in about 2.3 times anhydrous toluene of the total amount of the reactant. After tin (II) 2-ethylhexanoate (Sn(Oct)$_2$) was added as a catalyst, decalactone (DL) from which moisture was removed by a base alumina filter was added. The mixture was taken out of the glove box, put in a silicone oil bath at 120° C., and stirred for 48 to 60 hours to undergo ring-opening polymerization so that the molecular weight of a side chain (DL) was 23 wt % based on the graft copolymer. In this case, the ring-opening polymerization was performed by the grafting from method. After the reaction, chloroform was further added and dissolved at 4.8 to 5.5% w/v, and the mixture was purified twice in methanol or −70° C. methanol. The purified product was dried in a vacuum oven at 40° C. for 3 days to synthesize a butyl rubber-decalactone graft copolymer. (Yield: 80 to 97%) (BR-g-PD)

<Example 2> Synthesis of BR-g-PD33

BR-g-PD33 was synthesized in the same manner as in Example 1, except that the molecular weight of decalactone was 33 wt % based on the graft copolymer.

<Example 3> Synthesis of BR-g-PD43

BR-g-PD43 was synthesized in the same manner as in Example 1, except that the molecular weight of decalactone was 43 wt % based on the graft copolymer.

<Example 4> Synthesis of BR-g-PD53

BR-g-PD53 was synthesized in the same manner as in Example 1, except that the molecular weight of decalactone was 53 wt % based on the graft copolymer.

For the graft copolymers of Examples 1 to 4, Experimental Examples 1 to 5 were performed below.

<Experimental Example 1> Synthesis of Macroinitiator and Graft Copolymer and Confirmation of Molecular Weight of Graft Copolymer (1) In order to utilize butyl rubber as a macroinitiator, after epoxidation of an isoprene group of butyl rubber, an epoxy ring was opened with hydrochloric acid to introduce a hydroxyl group, and a chemical structure and a conversion rate were confirmed through 1H NMR for each step. Referring to FIG. 1A, a peak of 5.07 ppm representing isoprene disappeared after epoxidation, and a peak of 2.72 ppm representing epoxy appeared. After the introduction of the hydroxyl group, the epoxy peak disappeared, and a methine proton (3.98 ppm) of the hydroxyl group and peaks (5.23 ppm, 4.89 ppm) of protons with two different chemical environments of the double bond appeared, respectively.

Referring to FIG. 2A, it can be seen that even after each reaction in the SEC, a spectrum showing a molecular weight distribution did not change significantly, so that no change in molecular weight or no side reaction or reverse reaction of breaking polymer chains occurred at each step. At this time, as the reaction progressed, the molecular weight seemed to decrease somewhat on the SEC. This is because the polarity of the macroinitiator was increased by the hydroxyl group and a hydrodynamic volume was decreased due to an increase in interaction between the polymer chains, and it was confirmed through absolute molecular weight measurement that the molecular weight of the actual polymer did not change (Table 1).

(2) With respect to the synthesis of a graft copolymer by ring-opening polymerization of decalactone as a monomer to the macroinitiator, the conversion rate of the side chain monomer and the molecular weight thereof could be calculated through 1H NMR.

Referring to FIG. 1B, the peaks at a starting position of the macroinitiator moved and appeared at 5.17 ppm (methine proton) and 5.11 ppm (vinyl methylene proton), respectively. In addition, through a repeating unit peak (4.86 ppm) of polydecalactone (PD) and a peak (3.59 ppm) of methine proton at a terminal, it was confirmed that the side chains PD of all the copolymers of Examples 1 to 4 were polymerized with a high conversion rate of 95% or more. In addition, the molecular weight of PD was calculated through the integral value of the repeating unit peak (4.86 ppm). It could be seen that these values were almost consistent with the theoretical molecular weight considering the conversion rate (Table 2).

The molecular weight and a polydispersity index (PDI, Đ) of the polymerized copolymer were confirmed through the SEC analysis of FIG. 2B (Table 2). The molecular weight distribution of the copolymer showed a very even molecular weight distribution within 1.4, which means that the molecular weight was well controlled through controlled polymerization. In particular, it could be seen that as the molecular weight of PD increased, the molecular weight distribution decreased, and as the molecular weight of PD increased, the molecular weight was controlled better. On the other hand, the molecular weight of the polymer measured through SEC was smaller than the value calculated through the conversion rate. This was an error caused by SEC while calculating the molecular weight based on the PS standards. In addition, this is because the hydrodynamic volume is reduced because the PD is somewhat condensed in THF, which is a developing solvent of SEC.

TABLE 1

| Polymer | Conv. (%)[a] | $M_{n,SEC}$ (kg mol$^{-1}$) (Đ)[b] |
|---|---|---|
| BR-IP | | 190 (1.64) |
| BR-E | >99 | 185 (1.70) |
| BR-Hy | >99 | 180 (1.74) |

[a]Calculated by 1H NMR.
[b]Determined by SEC using poly(styrene) standards.

TABLE 2

| Polymer | $[M]_0/[I]_0$ | $M_{n, target}$ (for one side arm and total) (kg mol$^{-1}$)[a] | Conv. (%) | $M_{n, theo.}$ (for one side arm and total) (kg mol$^{-1}$)[b] | $M_{n, NMR/NEC}$ (for one side arm and total) (kg mol$^{-1}$)[c] | $M_{n, SEC}$ (kg mol$^{-1}$) (Đ)[d] |
|---|---|---|---|---|---|---|
| BR-g-PD23 | 11.8 | 2.00, 250 | 97 | 1.94, 248 | 1.94, 248 | 248 (1.44) |
| BR-g-PD33 | 18.5 | 3.14, 284 | 97 | 3.04, 281 | 3.06, 281 | 267 (1.42) |
| BR-g-PD43 | 28.3 | 4.81, 333 | 97 | 4.68, 329 | 4.60, 387 | 299 (1.38) |
| BR-g-PD53 | 42.2 | 7.19, 404 | 98 | 7.07, 396 | 7.01, 399 | 332 (1.33) |

[a]The weight fraction was determined and then targeted total $M_n$ was calculated.
[b]Calculated using conversion of PDL and $M_n$ of PIB-Hy determined by SEC.
[c]Calculated by NMR for $M_0$ of PDL and $M_0$ of PIB-Hy determined by SEC.
[d]Determined by SEC.

<Experimental Example 2> Thermal Characteristics and Phase Separation Form of Graft Copolymer The glass transition temperature ($T_g$) was measured through DSC. FIG. 3 illustrates DSC heat flow curves of the copolymers of Examples 1 to 4, and in the copolymers of Examples 1 to 4, the glass transition temperature of −64° C. of butyl rubber and the glass transition temperature ($T_g$) of PD of −50° C. were shown, respectively. This means that a butyl rubber phase and a PD phase of the copolymer were mixed with each other and phase separation occurred (Table 3).

The pyrolysis temperature (Ta) was analyzed by TGA. FIG. 4 illustrates TGA pyrolysis curves of the copolymers of Examples 1 to 4, and it was confirmed that the pyrolysis temperature (temperature when 5 wt % was decomposed) was 310° C. or higher to have excellent thermal stability. The pyrolysis of the synthesized polymer was shown in two stages, and at a lower temperature, the pyrolysis of PD occurred first, and then butyl rubber was pyrolyzed (Table 3).

Phase separation morphology was observed through AFM and SAXS. FIG. 5 illustrates AFM images of the surfaces of the copolymers of Examples 1 to 4, wherein the bright part was PD and the dark part was butyl rubber, and it was confirmed through the fact that as the PD content increased, the bright image appeared larger and more clearly. FIG. 6 illustrates SAXS data of the copolymers of Examples 1 to 4, and as a result of SAXS analysis, only the main peak appeared, but a well-defined higher ordered peak did not appear. Therefore, it could be seen that the copolymers of Examples 1 to 4 exhibited microphase separation, but no long-range ordered phase separation was shown. The distance of the separated phase may be calculated by substituting a q value of the main peak of SAXS into Equation. As a result, as the PD content of the graft copolymer increased, the domain size increased (FIG. 5, and Table 3). In addition, it can be seen that the main peak appears larger and more clearly as the PD content increases (FIG. 6). In particular, in the case of BR-g-PD43 and BR-g-PD53 with a high PD content, phase separation was maintained even when heated to 100° C. or higher.

TABLE 3

| Polymer | $T_g$ (° C.)[a] | $T_d$ (° C.)[b] | $f_{PD}$[c] | D (nm)[d] |
|---|---|---|---|---|
| BR-g-PD23 | −65, −50 | 315 | 0.22 | 14.2 |
| BR-g-PD33 | −64, −50 | 326 | 0.31 | 17.6 |
| BR-g-PD43 | −64, −50 | 326 | 0.41 | 19.5 |
| BR-g-PD53 | −65, −50 | 330 | 0.51 | 23.5 |

[a]result obtained through thermal flow analysis obtained in second heating by heating at a heating rate of 10° C./min under a nitrogen condition.
[b]temperature when weight loss of 5% occurred by heating at a heating rate of 10° C./min under a nitrogen condition through TGA.
[c]volume fraction calculated through molecular weights and densities 0.92 g/ml and 0.976 g/ml of BR-Hy and PD obtained through SEC and 1H NMR.
[d]domain size of BR-g-PD calculated through SAXS at 25° C. and 100° C.

<Experimental Example 3> Dynamic Mechanical Behavior of Graft Copolymer

In order to describe the dynamic mechanical behavior of elastomers of the graft copolymers of Examples 1 to 4, a storage modulus (G') and a loss modulus (G") were analyzed using a dynamic mechanical analyzer (DMA) and a stress relaxation test were performed. The results were illustrated in FIGS. 7 and 8, respectively.

FIG. 7 is a graph showing a value of the storage modulus measured by DMA, wherein it could be seen that the copolymers of Examples 1 to 4 had low elastic modulus of 1 MPa or less and the phase separation was maintained even at room temperature because TODT was not shown at room temperature. At this time, it can be observed that the storage modulus of BR-g-PD53 rapidly collapses at a low temperature, which can be expected due to bubbles or solvents in the sample.

FIG. 8 illustrates results of a stress relaxation test, wherein the relaxation modulus of the polymer represented a value divided by the initial modulus value to be standardized. Through the graph, it was confirmed that all of the copolymers of Examples 1 to 4 maintained stress relaxation even after 120 minutes and exhibited the properties of the elastomer. It could be seen that the higher the PD content, the longer the relaxation time. It can be considered that the PD serves to hold polymer chains by phase separation.

<Experimental Example 4> Mechanical Properties of Graft Copolymer

The mechanical properties of the copolymers according to Examples 1 to 4 were confirmed through a tensile test, and the results were shown in FIGS. 9A and 9B and Table 4.

FIG. 9A illustrates results of a stress at break test of the copolymers of Examples 1 to 4, and the copolymers of Examples 1 to 4 exhibited very excellent strain of 4000% or more.

This is a value increased by 6 times higher than the strain (680%) of butyl rubber, and it can be seen that a physical crosslinking point is well formed by phase separation. In addition, the Young's modulus (E) of the copolymer was 0.23 to 0.36 MPa, and represents physical properties applicable to a soft tissue biomaterial of 1 MPa or less. Therefore, it can be seen that the graft copolymer according to the present disclosure exhibits very flexible and soft superelastomer properties. The stress at break ob of the graft copolymer increased as the PD content increased, whereas the Young's modulus and M300 (modulus at strain 300%) decreased as the PD content increased. This is because, although relatively strong butyl rubber affects the initial strength of the specimen, the effect of PD increases as the strain increases. Since butyl rubber used in Example has a very large molecular weight (190 kg mol$^{-1}$) compared to an entanglement molecular weight of 8.8 kg mol$^{-1}$, chain entanglement occurs frequently, so that the initial Young's modulus at room temperature is stronger than a side chain with a relatively low molecular weight. On the other hand, PD has an entanglement molecular weight of 5.9 kg mol$^{-1}$, but except for BR-g-PD53, which has a molecular weight of 7.2 kg mol$^{-1}$ per side chain, other three types of graft copolymers have a shorter side chain molecular weight than the PD, and as a result, chain entanglement is relatively difficult to occur. In addition, as the side chain in the graft copolymer becomes longer, the free volume of the polymer chain increases, and as a result, the chain entanglement hardly occurs and the modulus is lowered.

FIG. 9B illustrates results of a repeated load test for confirming the elastic recovery properties of the graft copolymers of Examples 1 to 4, and the elastic recovery of each sample was confirmed through a residual strain after 5-repeated load tests until the strain 40%, 100%, and 1000%. At this time, the specimen returned after loading was relaxed for 20 minutes, and then the next load was applied. As a result, all four types of synthesized copolymers had high elastic recovery at the residual strain of about 10% in 40% strain and about 20% in 100% strain. The residual strain when tested at 40% strain was less than that when the sample was stretched to 100% strain. In particular, at 1000% strain, the elastic strain was about 90%, showing very good elastic recovery. Through this, it was confirmed that the synthesized polymer has high elastic recovery even when repeated deformation is applied due to the formation of physical cross-linking due to chain entanglement.

TABLE 4

| Polymer | Stress at break, $\sigma_b$ (MPa) | Shear strain, $\varepsilon_b$ (%) | Young's modulus, E (MPa) | 300% Modulus at strain, M300 (MPa) | Residual strain (%)[a] | | | Elasticity at 1000%[b] |
|---|---|---|---|---|---|---|---|---|
| | | | | | 40% | 100% | 1000% | |
| BR-IP | 0.11 ± 0.04 | 680 ± 74 | 0.65 ± 0.04 | 0.32 ± 0.02 | — | — | — | — |
| BR-g-PD23 | 0.64 ± 0.09 | 5060 ± 370 | 0.36 ± 0.04 | 0.26 ± 0.02 | 7 | 16 | 123 | 88 |
| BR-g-PD33 | 1.10 ± 0.24 | 4490 ± 539 | 0.32 ± 0.03 | 0.24 ± 0.01 | 9 | 15 | 91 | 88 |
| BR-g-PD43 | 1.55 ± 0.21 | 4638 ± 198 | 0.28 ± 0.02 | 0.21 ± 0.01 | 6 | 20 | 80 | 91 |
| BR-g-PD53 | 1.74 ± 0.14 | 5044 ± 249 | 0.23 ± 0.01 | 0.16 ± 0.01 | 9 | 26 | 123 | 92 |

[a]residual strain means final residual strain after 5 times-repeated load test
[b]Elasticity is calculated by the following Equation. (Maximum strain-residual strain)/Maximum strain × 100

In addition, FIGS. 10A and 10B illustrate how much the graft copolymers of Examples 1 to 4 have the Young's modulus as compared with a biological tissue, and FIG. 10A refers to Muiznieks & Keeley 2017, Zhao et al. 2020 and FIG. 10B refers to Ashby 2008.

Referring to FIG. 10A, the elastomer of the present disclosure exhibited a Young's modulus similar to that of the skin, which was stronger than softer soft tissues such as vocal cords and weaker than cartilage.

Referring to FIG. 10B, the stress at break of the elastomer of the present disclosure was similar to that of elastin, cartilage, and human skin, but the Young's modulus was somewhat weaker than that of elastin, blood vessels such as arteries, and skin. Therefore, it was confirmed that the elastomer according to the present disclosure is flexible enough as soft tissue and has a low Young's modulus, and thus can be utilized as a living tissue. In addition, depending on the content of BR and PD or if necessary, the Young's modulus and the stress at break may be increased through copolymerization with other crystalline polymers, and if necessary, the elastomer according to the present disclosure can be applied in wider fields by adjusting the physical properties.

<Example 5> Adhesive Property of Graft Copolymer

The adhesive force of the graft copolymers of Examples 1 to 4 was confirmed through three tests. The three tests were performed as a 180° peel test to measure the force when an adhesive film was attached to a stainless steel substrate and then peeled off in a 180° direction, a probe tack test for measuring the force when a cylindrical rod was vertically attached to or detached from the adhesive film, and a shear test of measuring a time taken when the adhesive film was detached from the substrate when a constant force is applied through a weight in a shear direction, and the results were illustrated in FIGS. 11A to 11C.

FIG. 11A illustrates results of the 180 degree peel test, and the copolymer adhesives of Examples 1 to 4 showed the adhesive force similar to that of an electrical tape. At this time, the adhesives BR-g-PD23 and BR-g-PD33 with a low PD content had the adhesive force of 1.83 N/cm and 1.94 N/cm, respectively, indicating superior adhesive force than the electrical tape (1.54 N/cm). As such, the adhesive with a low PD content exhibited higher adhesive force (1.03 N/cm and 1.32 N/cm, respectively) than the adhesives BR-g-PD43 and BR-g-PD53 with a high PD content. In addition, the copolymer adhesives of Examples 1 to 4 showed a strength of a removable & repositionable adhesive, and showed an interfacial adhesive failure. This means that the copolymers synthesized in Examples 1 to 4 are viscous enough to exhibit adhesive properties, but have sufficient cohesive force to maintain stress during peeling. Existing eco-friendly material-based adhesives require a process of mixing vegetable oil or a tackifier with synthetic polymers to have sufficient adhesive force, or improving properties of the polymer through crosslinking, or have excellent adhesive force, but some cohesive failure occurred. However, the graft copolymers according to the present disclosure have sufficient adhesive force without crosslinking or additives and can be used as an adhesive having the interfacial adhesive failure.

FIG. 11B illustrates results of an initial probe tack test, the initial adhesive force showed a tendency to increase as the PD content increase. When the PD was 43 wt % and 53 wt %, the initial adhesive force was 0.47 N and 0.78 N, respectively, which was higher than that of an adhesive with a low PD content.

FIG. 11C illustrates results of a shear test, and the lower the PD content, the better. In particular, BR-g-PD23, BR-g-PD33, and BR-g-PD43 showed a very excellent shear strength to be required for 30,000 minutes or more until the shear failure occurred. It can be seen that BR-g-PD23, BR-g-PD33, and BR-g-PD43 have a much better value than commercial adhesives, such as a scotch tape, a strong adhesive tape, an electrical tape, and a post-it.

As described above, the specific embodiments of the preparation method of the superelastomer according to an embodiment of the present disclosure, the superelastomer prepared using the same, and the molded article containing the superelastomer have been described, but it will be apparent that various modifications can be made without departing from the scope of the present disclosure.

Therefore, the scope of the present disclosure should not be limited to the embodiments and should be defined by the appended claims and equivalents to the appended claims.

In other words, the embodiments described above are illustrative in all aspects and should be understood as not being restrictive, and the scope of the present disclosure is represented by appended claims to be described below rather than the detailed description, and it is to be interpreted that the meaning and scope of the appended claims and all changed or modified forms derived from the equivalents thereof are included within the scope of the present disclosure.

What is claimed is:

1. A preparation method of a superelastomer comprising:
   (a) preparing an initiator represented by the following Chemical Formula 1; and
   (b) preparing a graft copolymer represented by the following Chemical Formula 2 by ring-opening polymerization of the initiator of step (a) and decalactone:

[Chemical Formula 1]

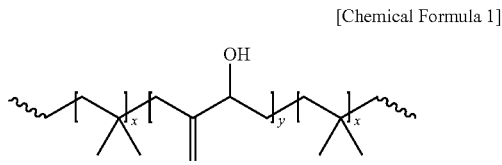

wherein, x is an integer of 1660 to 1680, and y is an integer of 30 to 60,

[Chemical Formula 2]

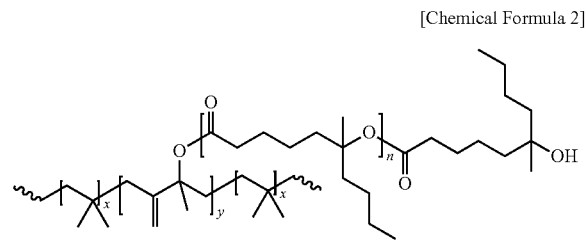

wherein, x is an integer of 1660 to 1680, y is an integer of 30 to 60, and n is an integer of 11 to 42.

2. The preparation method of the superelastomer of claim 1, wherein in step (a), the initiator is prepared by substituting isoprene of butyl rubber with an epoxy group and introducing a hydroxyl group.

3. The preparation method of the superelastomer of claim 1, wherein in step (b), tin (II) 2-ethylhexanoate is used as a catalyst for ring-opening polymerization.

4. The preparation method of the superelastomer of claim 1, wherein in step (b), the initiator and decalactone are ring-opening polymerized by a grafting-from method.

5. The preparation method of the superelastomer of claim 1, wherein step (b) is performed at 100 to 140° C. for 48 to 60 hours.

6. The preparation method of the superelastomer of claim 1, wherein in step (b), the molecular weight of decalactone is 23 to 53 wt % with respect to the graft copolymer.

7. A superelastomer represented by the following Chemical Formula 2 which is prepared by ring-opening polymerization of an initiator represented by the following Chemical Formula 1 and decalactone:

[Chemical Formula 1]

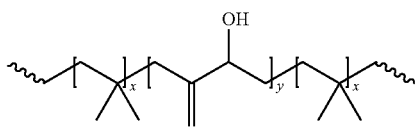

wherein, x is an integer of 1660 to 1680, and y is an integer of 30 to 60,

[Chemical Formula 2]

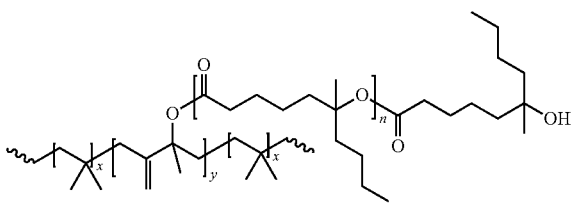

wherein, x is an integer of 1660 to 1680, y is an integer of 30 to 60, and n is an integer of 11 to 42.

8. The superelastomer of claim 7, wherein the superelastomer has a decomposition temperature of 310° C. or higher.

9. The superelastomer of claim 7, wherein the superelastomer has a strain at break of at least 4000%.

10. The superelastomer of claim 7, wherein the superelastomer has a Young's modulus of 1 MPa or less.

11. A molded article comprising the superelastomer of claim 7.

* * * * *